United States Patent
Wu

(10) Patent No.: US 12,425,144 B2
(45) Date of Patent: Sep. 23, 2025

(54) DATA TRANSMISSION PROCESSING METHOD AND APPARATUS, COMMUNICATION DEVICE, AND STORAGE MEDIUM

(71) Applicant: VIVO MOBILE COMMUNICATION CO., LTD., Guangdong (CN)

(72) Inventor: Jianming Wu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 18/435,642

(22) Filed: Feb. 7, 2024

(65) Prior Publication Data

US 2024/0178951 A1  May 30, 2024

Related U.S. Application Data

(63) Continuation of application No. PCT/CN2022/110267, filed on Aug. 4, 2022.

(30) Foreign Application Priority Data

Aug. 9, 2021 (CN) .......................... 202110909085.5

(51) Int. Cl.
 H04L 5/00 (2006.01)
 H04B 1/713 (2011.01)

(52) U.S. Cl.
 CPC .......... *H04L 5/0012* (2013.01); *H04B 1/713* (2013.01)

(58) Field of Classification Search
 CPC .... H04B 7/0617; H04B 7/086; H04B 7/0413; H04B 7/0456; H04B 7/0452;
 (Continued)

(56) References Cited

U.S. PATENT DOCUMENTS 7,813,262 B1 * 10/2010 Rao ...................... H04L 1/0668
 370/208
2005/0254461 A1 * 11/2005 Shin ...................... H04W 72/02
 370/208
(Continued)

FOREIGN PATENT DOCUMENTS

CN 101065919 A 10/2007
JP 2009147939 A 7/2009
(Continued)

OTHER PUBLICATIONS

Bao Dan et al.: "A Superimposed Pilot-Based Integrated Radar and Communication System", IEEE Access, IEEE, USA, vol. 8, Jan. 8, 2020 (Jan. 8, 2020), pp. 11520-11533, XP011767676, Doi: 10.1109/ACCESS.2020.2965153, Xi'an, China.
(Continued)

*Primary Examiner* — Eva Y Puente
(74) *Attorney, Agent, or Firm* — Price Heneveld LLP

(57) ABSTRACT

This application discloses a data transmission processing method and apparatus, a communication device, and a storage medium. The data transmission processing method includes: performing, by a transmit end, spectrum spreading on to-be-transmitted data through K orthogonal sequences, to obtain K orthogonal data matrices; the transmit end maps the K orthogonal data matrices onto different frequency division multiplexing OFDM subcarriers, to obtain K first OFDM signals, where the first OFDM signals are spectrum spreading data matrix OFDM signals; performing, by the transmit end, inverse fast Fourier transform IFFT processing on a $k^{th}$ first OFDM signal among the K first OFDM signals, to obtain a $k^{th}$ first OFDM time domain signal; and the transmit end maps the $k^{th}$ first OFDM time domain signal onto a $k^{th}$ transmit antenna, and transmits a first data signal through the $k^{th}$ transmit antenna.

18 Claims, 14 Drawing Sheets

(58) Field of Classification Search
CPC .... H04B 7/0482; H04B 7/0695; H04B 7/088; H04L 25/0204; H04L 5/0048; H04L 25/0224; H04L 25/0212; H04L 25/0242; H04L 5/0023; H04L 25/0202; H04J 11/00; H04J 11/0026; H04J 13/004; H04J 13/0029; H04J 13/0062; H04J 13/10; H04J 13/102
See application file for complete search history.

(56) References Cited

U.S. PATENT DOCUMENTS

| | | | |
|---|---|---|---|
| 2008/0043615 | A1 | 2/2008 | Li et al. |
| 2010/0002806 | A1* | 1/2010 | Lee ................... H04L 27/2647 375/316 |
| 2015/0341200 | A1* | 11/2015 | Bin Mohd Yussof .. H04L 23/00 370/204 |
| 2016/0254889 | A1* | 9/2016 | Shattil ................. H04L 5/0035 370/329 |
| 2021/0111938 | A1* | 4/2021 | Sahin ................. H04L 27/2626 |
| 2021/0149016 | A1 | 5/2021 | Murakami et al. |
| 2021/0226834 | A1* | 7/2021 | Shattil ................ H04L 27/2621 |

FOREIGN PATENT DOCUMENTS

| | | |
|---|---|---|
| WO | 2006057334 A1 | 6/2006 |
| WO | 2020219954 A1 | 10/2019 |
| WO | 2020122220 A1 | 6/2020 |

OTHER PUBLICATIONS

Andrew Zhang J et al: "Enabling Joint Communication and Radar Sensing in Mobile Networks—A Survey" arxiv.org, Cornell University Library, 201 Olin Library Cornell University Ithaca, NY 14853, Jan. 16, 2021 (Jan. 16, 2021), XP081860546, Online.

Kazuaki Takeda et al: "Investigation of Two-Dimensional Orthogonal Sequence Mapping to Multi-LayerReference Signal for LTE-Advanced Downlink", Vehicular Technology Conference Fall (VTC 2010 FALL), 2010 IEEE 72nd, Sep. 1, 2010 (Sep. 1, 2010), pp. 1-5, XP055596828, Piscataway, NJ, USA DOI: 10.1109/ VETECF.2010. 5594395 ISBN: 978-1-4244-3573-9, Yokosuka-shi, Japan.

Bai Ting et al: "OFDM MIMO Radar Waveform Design with High Range Resolution and Low Sidelobe Level", 2017 IEEE 17th International Conference On Communication Technology (ICCT), IEEE, Oct. 27, 2017 (Oct. 27, 2017), pp. 1065-1069, XP033340108, DOI: 10.1109/ICCT.2017.8359797, Zhengzhou, China.

Knill et al., "Coded OFDM Waveforms for MIMO Radars", IEEE Transactions On Vehicular Technology, vol. 70, No. 9, Sep. 2021, DOI: 10,1109/TVT.2021.3073268, Japan.

Zhou et al., "OFCDM: A Promising Broadband Wireless Access Technique", IEEE Communications Magazine, 2008, 03 months, vol. 46, No. 3,pp. 38/49 DOI: 10.1109/MCOM.2008.4463770, New York, NY, USA.

Liu et al., "MIMO-ODFM, The Research on Diversity Gain of of ODFM-MIMO Systems", Microcomputer Information, Dec. 31, 2006, sections 1-4, China.

Zhang et al, "A Low Complexity Turbo Detection Algorithm for MIMO-ODFM-CDM System", Radio Engineering, Dec. 31, 2007, sections 1-4, Beijing, China.

Liu et al, "Joint Radar and Communication Design: Applications, State-of-the-art, and the Road Ahead", IEEE Transactions on Communications, Jun. 30, 2020.

Yuan et al, "Spatio-Temporal Power Optimization for MIMO Joint Communication and Radio Sensing Systems With Training Overhead", IEEE Transactions On Vehicular Technology, vol. 70, No. 1, Jan. 2021, DOI: 10.1109/TVT.2020.3046438.

* cited by examiner

DATA TRANSMISSION PROCESSING METHOD AND APPARATUS, COMMUNICATION DEVICE, AND STORAGE MEDIUM

CROSS-REFERENCE TO RELATED APPLICATIONS

This application is a Bypass continuation application of PCT International Application No. PCT/CN2022/110267 filed on Aug. 4, 2022, which claims priority to Chinese Patent Application No. 202110909085.5, filed in China on Aug. 9, 2021, each of which are incorporated by reference herein in their entireties.

TECHNICAL FIELD

This application belongs to the field of communication technologies, and in particular, to a data transmission processing method and apparatus, a communication device, and a storage medium.

BACKGROUND

With the development of communication technologies, to implement integrated sensing and communication (ISAC) in communication, usually a manner in which different subcarriers are mapped onto different transmit antennas to perform spectrum interleaving is used to implement mutual orthogonality between transmit antennas. However, a disadvantage of a multiple input multiple output (MIMO)-orthogonal frequency division multiplex (OFDM) radar waveform is: Because the subcarriers mapped onto each transmit antenna are staggered at periodic intervals, and a quantity of intervals is determined by a quantity of transmit antennas. This has a great impact on a maximum sensing range. For example, it is assumed that the quantity of transmit antennas is N, and a quantity of periodic intervals of the mapped subcarriers is at least N, the maximum range that a radar may sense is reduced by N times. Therefore, there is a problem in the related art that radar sensing performance is poor.

SUMMARY

Embodiments of this application provide a data transmission processing method and apparatus, a communication device, and a non-transitory readable storage medium.

According to a first aspect, a data transmission processing method is provided, including:
  performing, by a transmit end, spectrum spreading on to-be-transmitted data through K orthogonal sequences, to obtain K orthogonal data matrices, where K is an integer greater than 1;
  mapping, by the transmit end, the K orthogonal data matrices onto different frequency division multiplexing OFDM subcarriers, to obtain K first OFDM signals, where the first OFDM signals are spectrum spreading data matrix OFDM signals;
  performing, by the transmit end, inverse fast Fourier transform IFFT processing on a $k^{th}$ first OFDM signal among the K first OFDM signals, to obtain a $k^{th}$ first OFDM time domain signal, where k is a positive integer less than or equal to K; and
  mapping, by the transmit end, the $k^{th}$ first OFDM time domain signal onto a $k^{th}$ transmit antenna, and transmitting a first data signal through the $k^{th}$ transmit antenna.

According to a second aspect, a data transmission processing method is provided, including:
  receiving, by a receive end, a target data signal;
  performing, by the receive end, preprocessing on the target data signal, to obtain a target time domain signal;
  performing, by the receive end, discrete Fourier transform on the target time domain signal to obtain a data matrix; and
  performing, by the receive end by using an orthogonal sequence, inverse spectrum spreading processing on the data matrix to obtain a received signal in a case that the target data signal is a first data signal, where
  the data matrix is an orthogonal data matrix in a case that the target data signal is the first data signal.

According to a third aspect, a data transmission processing apparatus is provided, including:
  a spectrum spreading module, configured to perform spectrum spreading on to-be-transmitted data through K orthogonal sequences, to obtain K orthogonal data matrices, where K is an integer greater than 1;
  a first mapping module, configured to map the K orthogonal data matrices onto different frequency division multiplexing OFDM subcarriers, to obtain K first OFDM signals, where the first OFDM signals are spectrum spreading data matrix OFDM signals;
  a first transformation module, configured to perform inverse fast Fourier transform IFFT processing on a $k^{th}$ first OFDM signal among the K first OFDM signals, to obtain a $k^{th}$ first OFDM time domain signal, where k is a positive integer less than or equal to K; and
  a first transmit module, configured to map the $k^{th}$ first OFDM time domain signal onto a $k^{th}$ transmit antenna, and transmit a first data signal through the $k^{th}$ transmit antenna.

According to a fourth aspect, a data transmission processing apparatus is provided, including:
  a second receive module, configured to receive, by a receive end, a target data signal;
  a preprocessing module, configured to perform, by the receive end, preprocessing on the target data signal, to obtain a target time domain signal;
  a second transformation module, configured to perform discrete Fourier transform on the target time domain signal to obtain a data matrix; and
  an inverse spectrum spreading module, configured to perform, by using an orthogonal sequence, inverse spectrum spreading processing on the data matrix to obtain a received signal in a case that the target data signal is a first data signal, wherein
  the data matrix is an orthogonal data matrix in a case that the target data signal is the first data signal.

According to a fifth aspect, a terminal is provided, including a processor, a memory, and a program or an instruction stored in the memory and executable on the processor, where the program or instruction, when executed by the processor, implements the steps of the method according to the first aspect, or implements the steps of the method according to the second aspect.

According to a sixth aspect, a terminal is provided, including a processor and a communication interface, where the processor is configured to: perform spectrum spreading on to-be-transmitted data through K orthogonal sequences, to obtain K orthogonal data matrices, where K is an integer greater than 1; map the K orthogonal data matrices onto different frequency division multiplexing OFDM subcarriers, to obtain K first OFDM signals, where the first OFDM signals are spectrum spreading data matrix OFDM signals;

and perform inverse fast Fourier transform IFFT processing on a $k^{th}$ first OFDM signal among the K first OFDM signals, to obtain a $k^{th}$ first OFDM time domain signal, where k is a positive integer less than or equal to K; and the communication interface is configured to map the $k^{th}$ first OFDM time domain signal onto a $k^{th}$ transmit antenna, and transmit a first data signal through the $k^{th}$ transmit antenna; or the communication interface is configured to receive a target data signal, and the processor is configured to: perform preprocessing on the target data signal, to obtain a target time domain signal; perform discrete Fourier transform on the target time domain signal to obtain a data matrix; and perform inverse spectrum spreading processing on the data matrix by using an orthogonal sequence to obtain a received signal when the target data signal is a first data signal, where the data matrix is an orthogonal data matrix in a case that the target data signal is the first data signal.

According to a seventh aspect, a network side device is provided, where the network side device includes a processor, a memory, and a program or an instruction stored in the memory and executable on the processor, where the program or instruction, when executed by the processor, performs the steps of the method according to the first aspect.

According to an eighth aspect, a network side device is provided, including a processor and a communication interface, where the processor is configured to: perform spectrum spreading on to-be-transmitted data through K orthogonal sequences, to obtain K orthogonal data matrices, where K is an integer greater than 1; map the K orthogonal data matrices onto different frequency division multiplexing OFDM subcarriers, to obtain K first OFDM signals, where the first OFDM signals are spectrum spreading data matrix OFDM signals; and perform inverse fast Fourier transform IFFT processing on a $k^{th}$ first OFDM signal among the K first OFDM signals, to obtain a $k^{th}$ first OFDM time domain signal, where k is a positive integer less than or equal to K; and the communication interface is configured to map the $k^{th}$ first OFDM time domain signal onto a $k^{th}$ transmit antenna, and transmit a first data signal through the $k^{th}$ transmit antenna.

According to a ninth aspect, a non-transitory readable storage medium is provided, storing a program or an instruction, where the program or instruction, when executed by a processor, implements the steps of the method according to the first aspect, or implements the steps of the method according to the second aspect.

According to a tenth aspect, embodiments of this application provide a chip, including a processor and a communication interface, where the communication interface is coupled to the processor, and the processor is configured to run a program or an instruction, to implement the steps of the method according to the first aspect, or implement the steps of the method according to the second aspect.

According to an eleventh aspect, a computer program/ program product is provided, being stored in a storage medium, where the computer program/program product, when executed by at least one processor, implements the method according to the first aspect, or implements the method according to the second aspect.

DETAILED DESCRIPTION

The technical solutions in embodiments of this application are clearly described below with reference to the accompanying drawings in embodiments of this application. Apparently, the described embodiments are merely some rather than all of embodiments of this application. All other embodiments obtained by a person of ordinary skill in the art based on embodiments of this application shall fall within the protection scope of this application.

In the specification and claims of this application, terms "first" and "second" are used to distinguish similar objects, but are not used to describe a specific sequence or order. It may be understood that the terms used in such a way is interchangeable in proper circumstances, so that embodiments of this application can be implemented in other sequences than the sequence illustrated or described herein. In addition, objects distinguished by "first" and "second" are usually of Type, and the number of objects is not limited. For example, a first object may be one or more than one. In addition, in the specification and claims, "and/or" means at least one of the connected objects, and the character "/" generally indicates an "or" relation between associated objects.

It should be noted that, the technology described in embodiments of this application is not limited to a long term evolution (LTE)/LTE-advanced (LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access (SC-FDMA), and other systems. The terms "system" and "network" in embodiments of this application are often used interchangeably, and the described technologies may be used both for the systems and radio technologies mentioned above and may also be used for other systems and radio technologies. The following descriptions describe a new radio (NR) system for the objective of being used as an example, and NR terms are used in most of the descriptions below. These technologies may also be applied to applications other than NR system applications, such as a 6th generation (6G) communication system.

Figure 1:
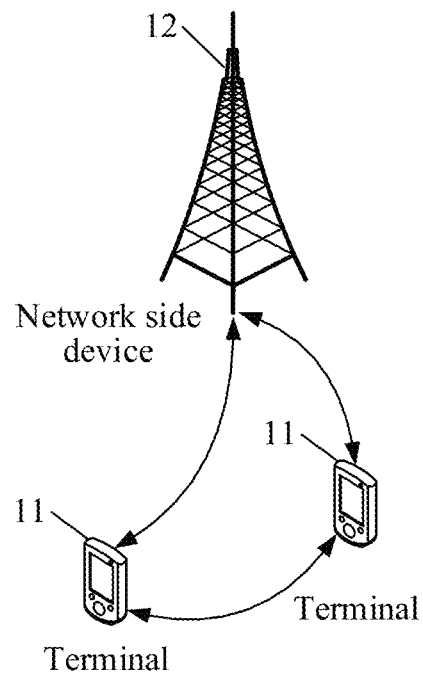
FIG. 1 is a structural diagram of a network system to which an embodiment of this application may be applied.

FIG. 1 is a block diagram of a wireless communication system to which an embodiment of this application may be applied. The wireless communication system includes a terminal 11 and a network side device 12. The terminal 11 may be a terminal side device such as a mobile phone, a tablet personal computer, a laptop computer, or referred to as a notebook computer, a personal digital assistant (PDA), a palmtop computer, a netbook, an ultra-mobile personal computer (UMPC), a mobile internet device (MID), an augmented reality (AR)/virtual reality (VR) device, a robot, a wearable device, vehicle user equipment (VUE), pedestrian user equipment (PUE), and a smart home (a home device with a wireless communication function, such as a refrigerator, a television, a washing machine, or a piece of furniture, and the like). The wearable device includes: a smart watch, a smart bracelet, smart headphones, smart glasses, smart jewelry (a smart bracelet, a smart bracelet, a smart ring, a smart necklace, a smart anklet, a smart anklet, and the like), a smart wristband, smart clothing, a game console, and the like. It should be noted that in embodiments of this application, a specific type of the terminal 11 is not limited. The network side device 12 may be a base station or a core network device, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a household NodeB, a household evolved NodeB, a wireless local area network (WLAN) access point, a wireless fidelity (WiFi) node, a transmitting receiving point (TRP) or some other proper terms in the field. Provided that the same technical effect is achieved, the base station is not limited to a specific technical vocabulary. It is to be noted that, in embodiments of this application, only a base station in the NR system is used as an example, but a specific type of the base station is not limited.

For case of understanding, some contents involved in embodiments of this application are described below:

1. ISAC Model.

Figure 2:
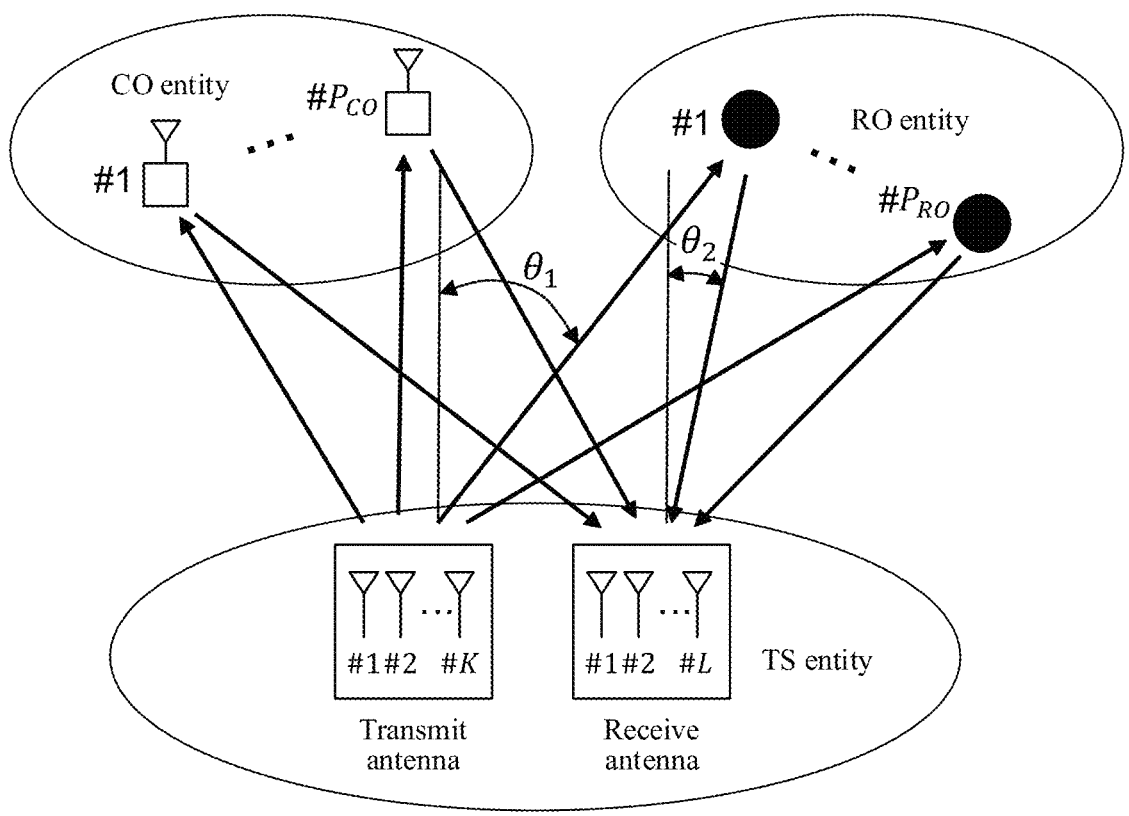
FIG. 2 is an example diagram of an ISAC model applied to an embodiment of this application.

There are two types of ISAC models involved in embodiments of this application; and a first model is a co-located antenna based device-free sensing system. A second model is a distributed antenna based device-free sensing system. As shown in FIG. 2, when the first model is used, azimuth angles of a transmit end and a receive end are the same. That is, $\theta_1 = \theta_2$. When the second model is used, the azimuth angles of the transmit end and the receive end are different. That is, $\theta_1 \neq \theta_2$. However, in the second model, $\theta_1$ may be calculated by $\theta_2$. Therefore, performance that may be achieved by using the two models should be equivalent. In embodiments of this application, the first model is mainly used as an example for description.

In the ISAC, three entities are mainly considered. A first entity is an ISAC entity, namely, an entity with a transmit (including a radar wave and data information for other entities) function and a receiving (including a reflected radar wave and data information from other entities) function, which is named a TS entity (Transmitter/Sensing Entity). For example, a base station of a cellular network, or a vehicle (equipped with a radar and a communication module function) in a vehicle to everything (V2X) application.

Optionally, the receiving function of the TS entity refers to receiving radar wave information transmitted and reflected by the TS entity. For the sake of simplicity and without affecting a technical description of this application, the TS entity does not receive data packets transmitted by other entities.

A second entity is a reflected target entity. In other words, a radar wave is reflected when reaching one target entity, and the TS entity senses a direction of arrival, a range, and Doppler related to the target entity through the reflected wave. The second entity is named a RO entity (Reflect Object Entity). The RO entity does not need to have a transmit function and a receiving function. For example, a conventional vehicle without a communication function, and the like.

A third entity is a data receiving entity. In other words, the TS entity transmits the radar wave and further carries communication data. The data receiving entity is only interested in communication data. Therefore, the data receiving entity is equipped with a communication receive module. The third entity is named a CO entity (Communication Object Entity). The CO entity receives the communication data and also reflects the radar wave. For example, a terminal in a cellular network service, a vehicle in a V2X application (at least equipped with a communication receive module function), and the like.

The TS entity has a sensing function and a communication function, mainly providing sensing of an object and a communication service to the terminal. Each TS entity includes one transmitter and one receiver. The transmitter and the receiver are located at a same location, but are physically separated from each other and have no signal interference with each other. Information may be exchanged between the transmitter and the receiver. Therefore, the receiver knows data information transmitted by the transmitter for use in data processing by the radar. In addition, each transmitter is equipped with K transmit antennas, and each receiver is equipped with L receive antennas.

The TS entity senses $P_{RO}$ RO entities, and mainly detects the DoA, the range, and the Doppler frequency shift. In addition, the TS entity senses $P_{RO}$ CO entities in a similar manner, and also provides the communication service. A quantity P of entities sensed by the TS entity meets: $P=P_{RO}+P_{CO}$. Each CO entity needs to receive a data packet transmitted by the TS entity.

2. MIMO Radar.

The use of a millimeter wave plays a catalyst role in the MIMO radar. Inherent characteristics (such as a great bandwidth and a high frequency) of the millimeter wave may effectively implement benefits of a small-size antenna and a high resolution, and also greatly increase a transmission rate of communication data. Another benefit of the MIMO radar is that the MIMO radar may simultaneously sense a plurality of reflectors, and effectively identify locations of different objects. Therefore, the MIMO radar is an indispensable technology in the field of integrated sensing and communication.

In a case that a reflector is unknown, transmit antennas of the MIMO radar need to be orthogonalized. In other words, each transmit antenna needs to transmit an independent omnidirectional radar waveform. The reason why the transmit antennas of the MIMO radar are orthogonal is that in the absence of reflector location information, the MIMO radar transmits detection signals in all directions in space, thereby providing a constant power at any location. Therefore, the MIMO radar is based on an omnidirectional antenna, and the DoA may be effectively sensed through MIMO multi-diversity characteristics and the method using Capon.

3. OFDM Radar.

The OFDM radar is a new technology that may be used in a radio system for an objective of integrated communication and radar. When transmitting an OFDM small data packet, the OFDM radar may produce a radar image and a related surrounding environment by receiving and processing echoes of a transmit signal.

After performing discrete Fourier transform (DFT) processing on the echo received signal, the OFDM radar mainly optimizes the echo received signal by using a maximum likelihood estimation (MLE) algorithm, and finally obtains information in a delay-doppler domain (DD domain) by using dual processing of fast Fourier transform (FFT) and inverse fast Fourier transform (IFFT), thereby accurately obtaining a range and Doppler information.

Optionally, the OFDM radar wave does not need to perform optimization on transmission data, because in a detection process, the received data symbol is removed before being converted into the DD domain. Therefore, a requirement of the OFDM radar for the transmission data may not need to be considered.

4. MIMO-OFDM Radar.

The MIMO-OFDM radar combines characteristics of the MIMO radar and the OFDM radar, and is also a recently proposed new technology. The MIMO-OFDM radar has detection capabilities of both the MIMO radar and the OFDM radar. Therefore, compared with a single-technology radar, the radar has better performance such as a greater detection range, a higher speed, and a better angle, and has a stronger communication capability. For example, region surveillance of a plurality of portable wireless networks may be implemented through the MIMO-OFDM radar.

The MIMO-OFDM radar for multi-user access may be implemented with OFDM signals on which spectrum interleaving is performed. In other words, a quantity of spacings of subcarriers and a quantity of MIMO transmit antennas need to remain the same. Because all antennas only transmit subcarrier channels that are independent of each other, interference of transmission signals between different antennas may be considered to be zero. In addition, because each antenna transmits an independent full-bandwidth radar signal, a diversity gain of MIMO is improved. Therefore, a radar resolution function is strong.

5. Radar Detection Technology.

Sensing of the direction of arrival (DoA) may rely on a conventional subspace-based algorithm, for example, an algorithm such as a multiple signal classification (MUSIC) algorithm, an estimation of signal parameters using rotational invariance techniques (ESPRIT) algorithm, a matrix pencil algorithm, and the like. The algorithm based on the subspace is mainly aimed at sensing of an unknown reflection object.

In addition, beamforming of a known object may rely on a conventional algorithm, such as a Capon method, namely, a minimum variance distortionless response (MVDR), a delay and sum beamformer, and a signal-to-noise ratio (SNR) maximizer, and the like.

The data transmission processing method provided in embodiments of this application is described in detail below by using some embodiments and application scenarios with reference to the accompanying drawings.

Figure 3:
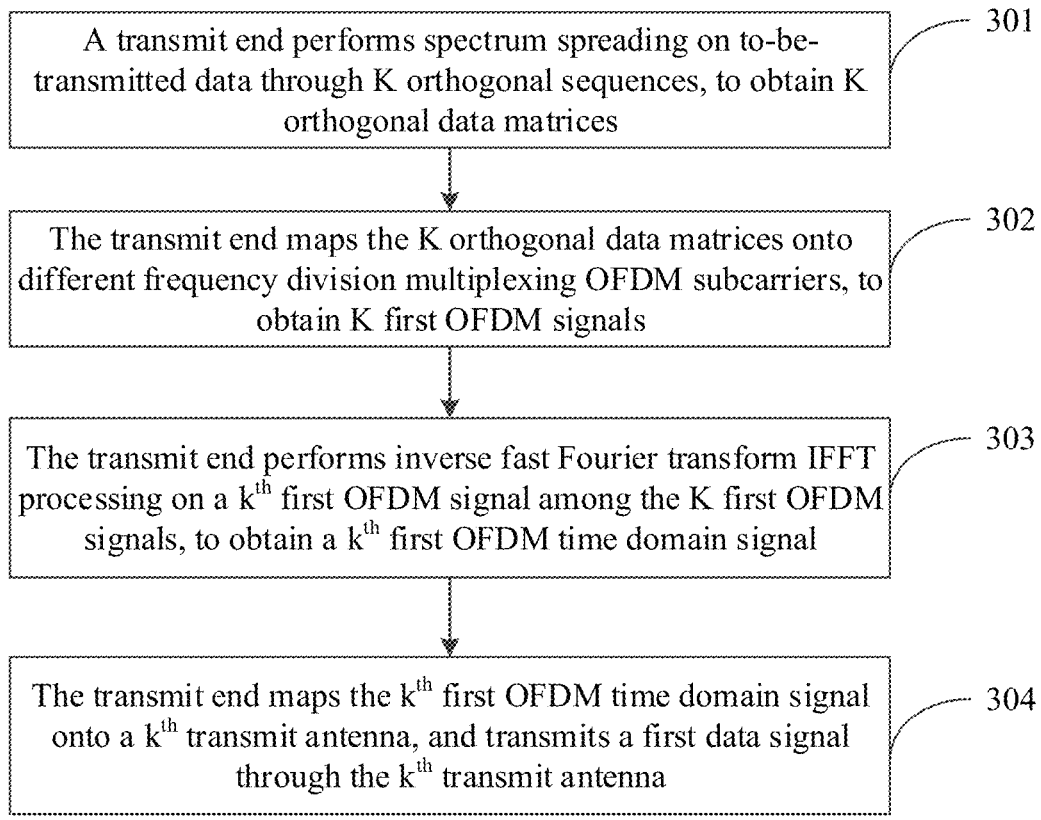
FIG. 3 is a flowchart of a data transmission processing method according to an embodiment of this application.

FIG. 3 is a flowchart of a data transmission processing method according to an embodiment of this application. As shown in FIG. 3, the method includes the following steps:

step 301: A transmit end performs spectrum spreading on to-be-transmitted data through K orthogonal sequences, to obtain K orthogonal data matrices, where K is an integer greater than 1;

step 302: The transmit end maps the K orthogonal data matrices onto different frequency division multiplexing OFDM subcarriers, to obtain K first OFDM signals, where the first OFDM signals are spectrum spreading data matrix OFDM signals;

step 303: The transmit end performs inverse fast Fourier transform IFFT processing on a $k^{th}$ first OFDM signal among the K first OFDM signals, to obtain a $k^{th}$ first OFDM time domain signal, where k is a positive integer less than or equal to K; and step 304: The transmit end maps the $k^{th}$ first OFDM time domain signal onto a $k^{th}$ transmit antenna, and transmits a first data signal through the $k^{th}$ transmit antenna.

It should be understood that the K antennas may be understood as all or a part of transmit antennas of the transmit end. In embodiments of this application, it is assumed that the K antennas are all transmit antennas of the transmit end.

The data transmission processing method provided in embodiments of this application is mainly applied in a MIMO-OFDM system, where the transmit end has K transmit antennas, and the receive end has L receive antennas. In an actual system, generally, an antenna port is used as a name. Each antenna port may be an antenna panel with a plurality of antenna elements, and is configured to form an analog beam. Therefore, in embodiments of this application, each antenna port may be understood as one transmit antenna, and the transmit antenna includes correlated and/or non-correlated MIMO antennas involved in the MIMO technology.

Optionally, the transmit end may map the K orthogonal data matrices onto different frequency division multiplexing OFDM subcarriers through an OFDM modulator, to obtain K first OFDM signals. The transmit end may be understood as a terminal side device, or may be understood as a network side device, and is not further limited herein.

The K orthogonal sequences may be represented by C, and $C=[c_1, c_2, \ldots, c_K]$, where a $k^{th}$ orthogonal sequence $c_k$ may be represented in a vector form: $c_k=[c_{k,1}, c_{k,2}, \ldots, c_{k,K'}]^T$, K' is a length of each orthogonal sequence, and $K' \geq K$.

It should be noted that the to-be-transmitted data may be understood as MIMO-OFDM data. The transmit end performs spectrum spreading on the to-be-transmitted data through K orthogonal sequences, to obtain K orthogonal data matrices. It may be understood that an orthogonal code division multiplexing (CDM) method is used to precode the to-be-transmitted data, thereby obtaining a new waveform for the orthogonal radar adapted to each transmit antenna. In this way, the MIMO transmit antennas may be orthogonal, the MIMO spatial diversity is increased, and a detection gain of the MIMO radar is greatly improved.

In embodiments of this application, a transmit end performs spectrum spreading on to-be-transmitted data through K orthogonal sequences, to obtain K orthogonal data matrices, where K is an integer greater than 1; the transmit end maps the K orthogonal data matrices onto different frequency division multiplexing OFDM subcarriers, to obtain K first OFDM signals, where the first OFDM signals are spectrum spreading data matrix OFDM signals; the transmit end performs inverse fast Fourier transform IFFT processing on a $k^{th}$ first OFDM signal among the K first OFDM signals, to obtain a $k^{th}$ first OFDM time domain signal, where k is a positive integer less than or equal to K; and the transmit end maps the $k^{th}$ first OFDM time domain signal onto a $k^{th}$ transmit antenna, and transmits a first data signal through the $k^{th}$ transmit antenna. In this way, because spectrum spreading is performed on the to-be-transmitted data through the K orthogonal sequences, MIMO transmit antennas may be made orthogonal to each other, and MIMO spatial diversity is increased. Therefore, embodiments of this application improve the radar sensing performance.

Optionally, in some embodiments, the performing, by a transmit end, spectrum spreading on to-be-transmitted data through K orthogonal sequences, to obtain K orthogonal data matrices includes:
  performing, by the transmit end, time-frequency domain spectrum spreading on the to-be-transmitted data through the K orthogonal sequences, to obtain the K orthogonal data matrices, where
  a rule of the time-frequency domain spectrum spreading meets any of the following:
  after time domain spectrum spreading is first performed on $K_t$ OFDM symbols, frequency domain spectrum spreading is performed on Kr subcarriers, both $K_t$ and $K_f$ are positive integers, and a sum of $K_t$ and $K_f$ is greater than 2; and
  after frequency domain spectrum spreading is first performed on the $K_f$ subcarriers, time domain spectrum spreading is performed on the $K_t$ OFDM symbols, both $K_t$ and $K_f$ are positive integers, and the sum of $K_t$ and $K_f$ is greater than 2.

In embodiments of this application, when the K orthogonal sequences are used to perform time domain spectrum spreading on the to-be-transmitted data, only time domain spectrum spreading may be performed, only frequency domain spectrum spreading may be performed, or time domain spectrum spreading and frequency domain spectrum spreading may be simultaneously performed. When $K_t$ is equal to 1, it may be understood that time domain spectrum spreading is not performed, and when $K_f$ is equal to 1, it may be understood that frequency domain spectrum spreading is not performed.

Optionally, a length K' of the orthogonal sequence meets: $K'=K_t K_f$, and $K' \geq K$.

Optionally, K' is configured or pre-configured through higher layer signaling, or K' is determined based on a quantity of antennas.

In embodiments of this application, the higher layer signaling may include radio resource control (RRC) signaling. If K' is determined based on the quantity of antennas, K' may be equal to K, or may be a preset value added to K or may be a multiple of K. This is not further limited herein.

Optionally, $K_t$ and $K_f$ are indicated through lower layer signaling. For example, $K_t$ and $K_f$ may be indicated through a medium access control control element (MAC-CE) or a physical downlink control channel (PDCCH).

Optionally, in some embodiments, the method further includes:
  mapping, by the transmit end, the to-be-transmitted data onto different OFDM subcarriers, to obtain K" second OFDM signals, where K" is a positive integer less than or equal to K;
  performing, by the transmit end, inverse fast Fourier transform IFFT processing on a $k^{th}$ second OFDM signal among the K" second OFDM signals, to obtain a $k^{th}$ second OFDM time domain signal, where k is a positive integer less than or equal to K"; and
  mapping, by the transmit end, the $k^{th}$ second OFDM time domain signal onto K transmit antennas through multiple input multiple output MIMO precoding or MIMO beamforming, and transmitting a second data signal through the K transmit antennas, where
  the first data signal is carried in a first transport block, the second data signal is carried in a second transport block, and the first transport block and the second transport block are alternately transmitted in time domain.

In embodiments of this application, due to CDM spectrum spreading, there is a specific limit on a peak value of a data rate. Although CDM spectrum spreading may provide a corresponding SNR gain, and indirectly increase the data rate, this requires increasing a modulation order of quadrature amplitude modulation (QAM). However, an extremely high modulation order may affect performance of the radar waveform. Therefore, in embodiments of this application, the first data signal and the second data signal are alternately transmitted in time domain through the first transport block and the second transport block, thereby improving the data transmission performance and improving the radar performance.

The first transport block may be understood as a Type-I block, the second transport block may be understood as a Type-II block, and both the first transport block and the second transport block may be referred to as ODFM transport blocks. Because two types of ODFM transport blocks are used to dynamically switch or adjust sensing and communication waveforms, the data transmission performance may be guaranteed and the radar performance may be improved. That the first data signal is carried on the first transport block may be understood as: transmitting the first data signal on the first transport block, to be specific, transmitting a MIMO OFDM radar signal based on orthogonal CDM in the first transport block. That the second data signal is carried on the second transport block may be understood as transmitting the second data signal on the second transport block, to be specific, transmitting a conventional MIMO OFDM data signal in the second transport block.

Optionally, in some embodiments, the first data signals transmitted on different antennas are orthogonal to each other.

Optionally, in a case that the transmit end transmits the second data signal through the second transport block, the method further includes:

performing, by the transmit end, beamforming according to a transmission type and a direction of arrival DoA obtained in the first transport block, where the transmission type is single-user MIMO or multi-user MIMO.

Optionally, in some embodiments, the performing, by the transmit end, beamforming according to a transmission type and a DoA obtained in the first transport block includes:

performing, by the transmit end, beamforming on a communication object CO entity of a receive end according to the transmission type and the DoA obtained in the first transport block; and performing, by the transmit end, beamforming on a reflection object RO entity of the receive end according to the transmission type and the DoA obtained in the first transport block in a case that quality of service QoS of the CO entity is met, and the transmit end has remaining available shaped beams and/or energy that are used for transmission with the CO entity.

In embodiments of this application, the performing, by the transmit end, beamforming according to a transmission type and a DoA obtained in the first transport block includes:

determining, by the transmit end, at least two beam directions of each MIMO layer according to azimuth angles of a CO entity and a RO entity; and performing, by the transmit end, beamforming on the CO entity and the RO entity in the at least two beam directions for each MIMO layer.

It should be noted that in embodiments of this application, a difference between a MIMO-OFDM transmission method of the second transport block and a conventional MIMO-OFDM transmission method is that on each MIMO layer, in addition to transmitting the data packet, the TS entity also needs to consider sensing the RO entity. Therefore, when beamforming is performed on each MIMO layer, the azimuth angles of the CO entity and the RO entity need to simultaneously be considered. In other words, the TS entity considers performing multi-directional beamforming on each MIMO layer. According to the azimuth angles of the CO entity and the RO entity, and through the MVDR algorithm, the TS entity determines to perform multi-directional beamforming on each MIMO layer.

Optionally, in each MIMO layer, a quantity of beamformed beams oriented to the CO entity is one, and a quantity of beamformed beams oriented to the RO entity is at least one.

Optionally, in some embodiments, a first beam corresponding to the first data signal and a second beam corresponding to the second data signal meet the following conditions:

the first beam has different beam directions in two adjacent time periods; and the second beam has an unchanged beam direction in different time periods.

In embodiments of this application, the first beam may be understood as a sensing target beam, and the second beam may be understood as a communication target beam. In different time periods, a beamforming direction that has a communication target remains unchanged, but a direction of the sensing target beam may be switched from one to another.

Optionally, the first transport block includes X sensing sub-blocks, each sensing sub-block includes N OFDM symbols, and both X and N are positive integers. The second transport block includes Y slots, and Y is a positive integer.

In embodiments of this application, X and Y may be configured in RRC.

Optionally, the transmit end periodically and alternately transmits the first data signal and the second data signal through the first transport block and the second transport block; or the transmit end transmits the first data signal through the first transport block or transmits the second data signal through the second transport block according to target switching signaling, where the target signaling is used for indicating to transmit a data signal through the first transport block or the second transport block.

In embodiments of this application, the first transport block and second transport block may be periodically switched, or may be switched through target signaling. It should be understood that the transmit end and the receive end should have consistent understanding of switching between the first transport block and the second transport block.

Optionally, in some embodiments, after the mapping, by the transmit end, the $k^{th}$ first OFDM time domain signal onto a $k^{th}$ transmit antenna, and transmitting a first data signal through the $k^{th}$ transmit antenna, the method further includes:

receiving, by the transmit end, feedback information and first indication information transmitted by a CO entity of a receive end, where the feedback information is used for indicating that the first data signal is successfully received, and the first indication information is used for indicating a geographical location of the CO entity.

In embodiments of this application, in the Type-I block, the TS entity at the transmit end transmits an orthogonal CDM radar wave (namely, the first data signal), and simultaneously carries data. When the CO entity at the receive end receives a related data packet, the CO entity at the receive end needs to feed back reception success information of the data packet to the TS entity at the transmit end. In addition, the CO entity may notify the TS entity of a geographical location of the CO entity through control signaling. The TS entity may comprehensively determine which entities (namely, reflectors) belong to the CO entity and which entities belong to the RO entity according to all parameters detected in the Type-I block. For example, the TS entity may calculate general coordinates of the CO entity by using an azimuth angle and range information, and calculate whether the reflector belongs to the CO entity by comparing the azimuth angle and the range information with the feedback geographical location information.

Optionally, the feedback information and the first indication information are carried on a physical uplink shared channel (PUSCH); or the feedback information and the first indication information are carried on a physical uplink control channel (PUCCH). The first indication information is carried in higher layer signaling.

It should be understood that, in embodiments of this application, an example in which the transmit end is used as a network side device and the receive end is used as a terminal is used for description. Certainly, in a V2X application scenario, in a case that the transmit end is the terminal and the receive end is also the terminal device, the first indication information is carried on a physical sidelink shared channel (PSSCH) or a physical sidelink control channel (PSCCH).

To better understand this application, some specific examples are described in detail below.

Solution 1: A MIMO OFDM Waveform Technology Based on CDM Characteristics.

In a MIMO-OFDM system, the transmit end has K transmit antennas, and the receive end has L receive antennas.

First, an orthogonal sequence $c_k$ performs spectrum spreading on data in time domain and/or frequency domain; and then the data is mapped onto different OFDM subcarriers through an OFDM modulator to obtain an OFDM signal, and then the OFDM signal is converted into an OFDM time domain signal through IFFT processing. Finally, the radar data signal is transmitted through a $k^{th}$ independent MIMO antenna.

The orthogonal sequence $c_k$ may be represented in a vector form, namely, $$c_k = [c_{k,1}, c_{k,2}, \ldots, c_{k,K'}]^T, \text{ where}$$

Optionally, $C = [c_1, c_2, \ldots, c_K]$, and should meet the following requirements:

$$\begin{cases} c_k^T c_{k'}^* = 1 & \text{if } k = k' \\ c_k^T c_{k'}^* = 0 & \text{else} \end{cases}$$

Therefore, an orthogonal sequence variance meets the following condition: $C^H C = 1$ or $C^T C^* = 1$, where $C^H$ is an hermitian matrix of a matrix C.

Optionally, K', and is a length of each orthogonal sequence, and K is a quantity of transmit antennas, which needs to meet $K' \geq K$.

Figure 4:
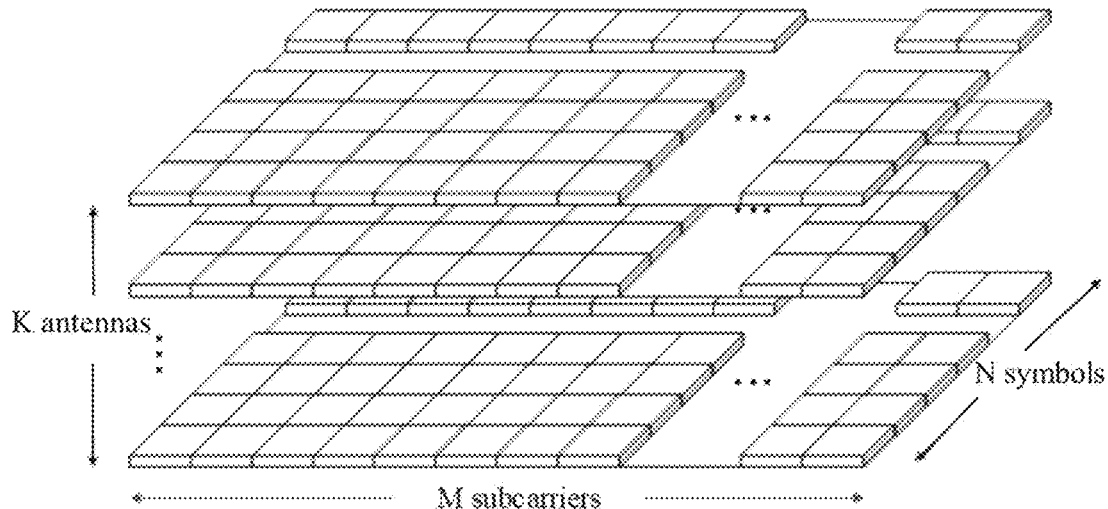
FIG. 4 is a schematic diagram of a structure of an OFDM transport block in a data transmission processing method according to an embodiment of this application.

Optionally, as shown in FIG. 4, an OFDM transport block is a CDM-MIMO OFDM transmission resource, which includes frequency domain, time domain, and space domain. Frequency domain is M OFDM sub-carriers. Time domain is N OFDM symbols, a length of each symbol is $T_{sym} = T + T_{cp}$, $T_{cp}$ is a length of a cyclic prefix (CP), and space domain is K transmit antennas.

Figure 5:
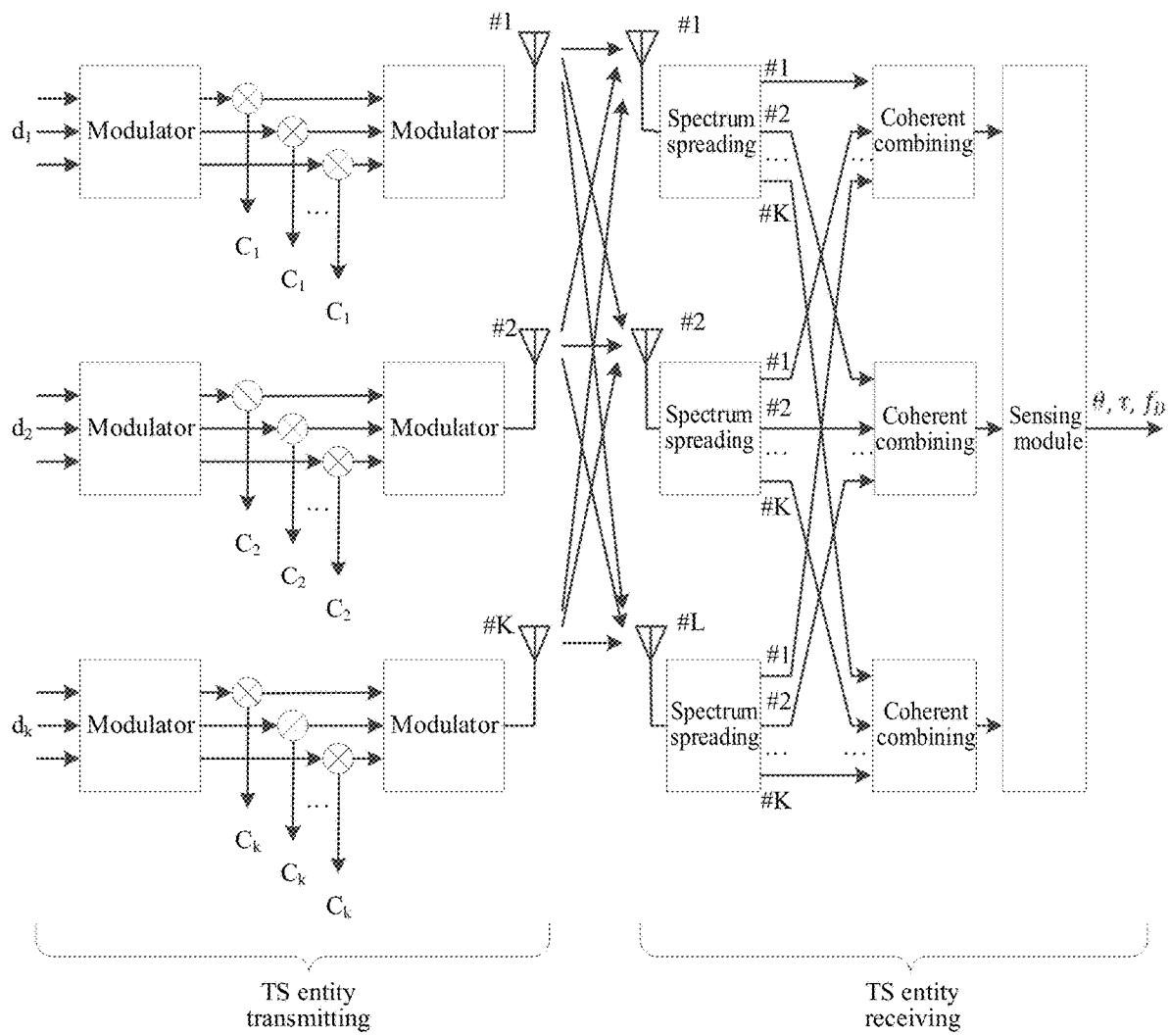
FIG. 5 is an example flowchart 1 of a data transmission processing method according to an embodiment of this application.

As shown in FIG. 5, the TS entity includes the following several parts. The orthogonal sequence $c_k$ performs spectrum spreading on a data vector $d_k$ on which modulation (for example, QAM) and channel coding (for example, low density parity code, (LDPC)) are performed in time domain and/or frequency domain, thereby forming a two-dimensional M×N data matrix, namely, $d_k \boxtimes_{K_f K_t} c_k$, where $\boxtimes_{K_f K_t}$ is an orthogonal sequence mapping symbol, which is determined according to mapping manners of different CDMs. Details are described in solution 2 below. Matrix data produces 1×MN time domain signals through IFFT processing, and is transmitted at the $k^{th}$ transmit antenna.

The receive end of the TS entity performs inverse spectrum spreading on a signal of each receive antenna by using $c^*_k$, and then performs coherent combining. An output signal is input into a sensing module, to perform sensing on a direction of arrival θ, a range range τ, and Doppler $f_D$.

Figure 6:
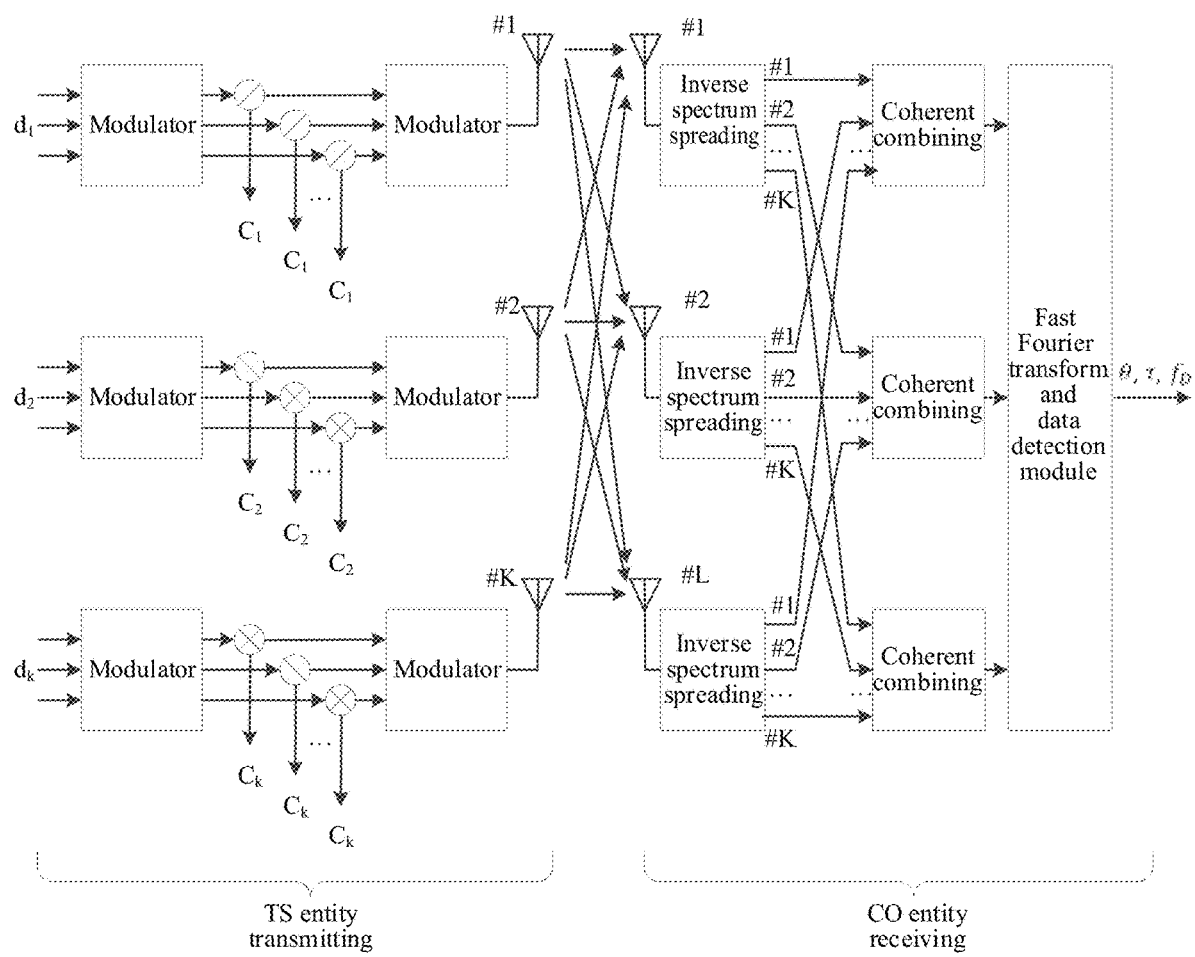
FIG. 6 is an example flowchart 2 of a data transmission processing method according to an embodiment of this application.

Similarly, as shown in FIG. 6, the receive end of the CO entity performs inverse spectrum spreading on a signal of each receive antenna by using $c^*_k$, and then performs coherent combining. The output signal is input into the FFT and a data detection module, to detect the data signal, namely, $\hat{d}_1, \hat{d}_2, \ldots, \hat{d}_K$.

Optionally, data detection is the same as conventional OFDM data packet detection. This is not repeated herein.

Because in the CDM-MIMO OFDM transmission method, introducing the orthogonal sequence $c_k$ mainly aims to improve the MIMO diversity gain, thereby enhancing radar sensing performance, transmission performance (such as a transmission data peak value) of communication may be affected to a certain extent.

Solution 2: Mapping Manner of CDM.

CDM spectrum spreading may use a mapping manner in a time domain and/or frequency domain direction. It is assumed that spreading factors of OFDM in time frequency domain (namely, Time Frequency Domain, T-F domain) are respectively $K_t$ and $K_f$. One orthogonal sequence $c_k$ performs spectrum spreading on each data symbol $s_k$ in the time domain direction, and each data symbol $s_k$ is then transmitted on the $k^{th}$ transmit antenna. Therefore, after inverse spectrum spreading is performed on the receive end through $c^*_k$, symbols $s_k$ transmitted from different transmit antennas are orthogonal, and do not interfere with each other.

The OFDM signal may first perform spectrum spreading on $K_t$ OFDM symbols in time domain, and then perform spectrum spreading on $K_f$ subcarriers in frequency domain. Similarly, the OFDM signal may also first perform spectrum spreading on $K_f$ subcarriers in frequency domain, and then perform spectrum spreading on $K_t$ OFDM symbols in time domain. Sizes of spreading factors $K_t$ and $K_f$ are determined according to different services of the transmit end. When CDM spectrum spreading only uses the mapping manner in the time domain direction, $K_f = 1$; and CDM spectrum spreading may also only use the mapping manner in the frequency domain direction, namely, $K_t = 1$.

Different spectrum spreading mapping manners should be used for different requirements of an object that is sensed. This is because if the CDM spectrum spreading uses the mapping manner in the time domain direction, a maximum range of the object that may be sensed is reduced, and if the CDM spectrum spreading uses the mapping manner in the frequency domain direction, a maximum Doppler frequency of the object that may be sensed is reduced. Therefore, the TS entity may adjust a length of the time domain direction and a length of the frequency domain direction according to the required quality of service (QOS) in a sensing process. In a scenario involving high-speed movement or few reflectors (open regions), the TS entity needs to consider a mechanism of CDM spectrum spreading in frequency domain; and in a scenario involving low-speed movement or multi-reflectors (dense regions), the TS entity needs to consider a mechanism of CDM spectrum spreading in time domain.

A length K' of the orthogonal sequence required for CDM spectrum spreading is at least equal to a quantity K of transmit antennas, to be specific, $K' \geq K$. In addition, in a spectrum spreading mapping process, the TS entity may consider two parameters to implement mapping in the time domain direction and the frequency domain direction. In other words, a spectrum spreading mapping parameter in the frequency domain direction is $K_f$, and a spectrum spreading mapping parameter in the time domain direction is $K_t$. Therefore, $K_f$ and $K_t$ need to meet the following condition: $K' = K_f K_t$.

In actual application, the parameter K' may be configured or pre-configured through higher layer signaling such as RRC, or may be directly configured in a transmit antenna mapping manner (to be specific, K' = K), and $K_f$ or $K_t$ may notify the CO entity (such as MAC-CE or PDCCH, and the like) through relatively lower layer signaling, so that the CO entity may correctly receive a data packet transmitted by the TS entity.

The orthogonal sequence $c_k$ used in the CDM spectrum spreading mapping manner may be any orthogonal sequence or pseudo orthogonal sequence, such as Walsh code, Barker code, a PN sequence, a Zadoff-Chu sequence, and the like.

Solution 3: Detection Methods for a DoA, a Range, and Doppler.

After spectrum spreading is performed on the MIMO-OFDM signal through $c_k$ (or may be considered as orthogonal precoding), the MIMO-OFDM transmit signal on the $k^{th}$ antenna and the $n^{th}$ symbol may be represented as:

$$s_{k,n}(t) = \frac{1}{\sqrt{M}} \sum_{m=0}^{M-1} \left[ d_k \boxtimes_{K_f K_t} c_k \right]_{n,m} e^{j2\pi m \Delta f t} \times rect\left( \frac{t - nT_{sym}}{T_{sym}} \right).$$

$\boxtimes_{K_f K_t}$ is a mapping symbol of the orthogonal sequence, and is defined as:

$$\left[ d_k \boxtimes_{K_f K_t} c_k \right]_{n,m} = d_k \left( \left\lfloor \frac{m}{K_f} \right\rfloor + \left\lfloor \frac{n}{K_t} \right\rfloor T_{sym} \right) \cdot c_{k, k_{n,m}^{(mod)}}.$$

$d_k(m+nT)$ represents the $m^{th}$ subcarrier data of the $n^{th}$ OFDM symbol, $\Delta f$ is a subcarrier spacing, $rect(t)$ is a rectangular function, a value of $t \in [0,1]$ is 1, or otherwise a value of $t \in [0, 1]$ is 0, $\lfloor x \rfloor$ is a floor function of X, and $k_{n,m}^{(mod)}$ is defined as:
- $k_{n,m}^{(mod)} = K_f \times (n \bmod K_t) + (m \bmod K_f)$ if frequency domain mapping first and then time domain mapping
- $k_{n,m}^{(mod)} = K_t \times (m \bmod K_f) + (n \bmod K_t)$ if time domain mapping first and then frequency domain mapping It should be understood that after inverse spectrum spreading is performed through $c^*_k$, the following result may be obtained:

$$\begin{cases} \sum_{K_f, K_t} \left[ d_k \boxtimes_{K_f K_t} c_k \right]^T c^*_{k'} = [d_k]_{n',m'} & \text{if } k = k' \\ \sum_{K_f, K_t} \left[ d_k \boxtimes_{K_f K_t} c_k \right]^T c^*_{k'} = 0 & \text{else} \end{cases}$$

$$m' = \left\lfloor \frac{m}{K_f} \right\rfloor \text{ and } n' = \left\lfloor \frac{n}{K_t} \right\rfloor.$$

Therefore, on the $k^{th}$ antenna, a signal $t \in [0, NT_{sym}]$ transmitted on N OFDM symbol blocks may be represented as:

$$\Re \left\{ \sum_{n=0}^{N-1} s_{k,n}(t) e^{j2\pi f_c t} \right\}.$$

$f_c$ is a central frequency, and $\Re(x)$ is a real function of x.

For a $p^{th}$ point target, a transmit radio wave is obtained through a complex channel gain $h_p$ (including a path loss and a radar cross section effect), an azimuth angle $\theta_p$, a round trip delay $\tau_p$, and a normalized Doppler frequency shift $f_{D,p} = 2v_p f_c/c$, where $f_c$, $v_p$, and c respectively represents a central frequency, a radial velocity, and a light propagation speed.

For the azimuth angle $\theta_p$, a vector of the transmit antenna and a vector of the receive antenna may be represented as:

$$a_T(\theta_p) = \left[ 1, e^{j\frac{2\pi}{\lambda} d_T \sin(\theta_p)}, \ldots, e^{j\frac{2\pi}{\lambda} d_T(K-1)\sin(\theta_p)} \right]^T; \text{ and}$$

$$a_R(\theta_p) = \left[ 1, e^{j\frac{2\pi}{\lambda} d_R \sin(\theta_p)}, \ldots, e^{j\frac{2\pi}{\lambda} d_R(L-1)\sin(\theta_p)} \right]^T.$$

$a_T(\theta_p) \in \mathbb{C}^{K \times 1}$ and $a_R(\theta_p) \in \mathbb{C}^{L \times 1}$ are respectively a transmit vector and a receiving vector for a target azimuth angle $\theta_p$, and $\lambda$, $d_T$, and $d_R$ respectively represent a signal wavelength, a spacing of the transmit antenna, and a spacing of the receive antenna.

For ease of description, without considering noise in a receiving process, the transmit signal reaches the $p^{th}$ point target and reaches the $l^{th}$ receive antenna through reflection. A received signal of the transmit signal may be represented as:

$$y_{p,k,l}(t) = h_p [a_R(\theta_p)]_l [a_T^T(\theta_p)]_l [a_T^T(\theta_p)]_k \Sigma_{n=0}^{N-1} s_{k,n}(t - \tau_p) e^{-j2\pi f_c \tau_p} e^{j2\pi f_{D,p} t}.$$

$[x]_l$ represents an $l^{th}$ element of the vector x.

Because $e^{-j2\pi f_c \tau_p}$ is constant, and may be represented by $h'_p(\tau_p) = h_p \cdot e^{-j2\pi f_c \tau_p}$, $$y_{p,k,l}(t) = h'_p(\tau_p)[a_R(\theta_p)]_l [a_T^T(\theta_p)]_k \Sigma_{n=0}^{N-1} s_{k,n}(t-\tau_p) e^{j2\pi f_{D,p} t}.$$

Considering the following assumption, CP duration is greater than a round trip delay of a farthest point target, to be specific, $T_{cp} \geq \tau_{max}$.

Therefore, after removing CP of the $n^{th}$ OFDM symbol and performing M sampling on the received signal, to be specific, $$t = nT_{sym} + T_{cp} + \frac{qT}{M},$$

the received time domain signal may be represented as:

$$y_{p,k,l,n}(q) = h'_p(\tau_p)[a_R(\theta_p)]_l [a_T^T(\theta_p)]_k \frac{1}{\sqrt{M}} \sum_{m=0}^{M-1} \left[ d_k \boxtimes_{K_f K_t} c_k \right]_{n,m} \times$$

$$e^{j2\pi m \Delta f \left( nT_{sym} + \frac{qT}{M} - \tau_p \right)} e^{j2\pi f_{D,p} \left( nT_{sym} + \frac{qT}{M} \right)}$$

In addition, because $\Delta f T_{sum} \approx \Delta f T = 1$, and $e^{j2\pi mn \Delta f T_{sym}} \sim 1$ may be considered, $$y_{p,k,l,n}(q) = h'_p(\tau_p)[a_R(\theta_p)]_l [a_T^T(\theta_p)]_k e^{j2\pi f_{D,p} nT_{sym}} \cdot e^{j2\pi f_{D,p} T \frac{q}{M}} \times$$

$$\frac{1}{\sqrt{M}} \sum_{m=0}^{M-1} \left[ d_k \boxtimes_{K_f K_t} c_k \right]_{n,m} e^{-j2\pi m \Delta f \tau_p} \cdot e^{j2\pi m \frac{q}{M}}$$

Generally, it may be assumed that $T_{cp} \geq \tau_{max}$ and $f_{D,p} T \ll 1$. Therefore, the impact of ISI and ICI does not need to be considered. In other words, $e^{j2\pi f_{D,p} Tq/M}$ has no impact on a DFT operation, and may be fused to $h'_p(\tau_p)$. After DFT processing, the foregoing formula may be represented as:

$$y_{p,k,l,n}(m) =$$

$$h''_p(\tau_p, m)[a_R(\theta_p)]_l [a_T^T(\theta_p)]_k \times \left[ d_k \boxtimes_{K_f K_t} c_k \right]_{n,m} e^{-j2\pi m \Delta f \tau_p} \cdot e^{j2\pi f_{D,p} nT_{sym}},$$

where $$h''_p(\tau_p, m) = h'_p(\tau_p) e^{j2\pi f_{D,p} T \frac{m}{M}} = h_p \cdot e^{-j2\pi f_c \tau_p} \cdot e^{j2\pi f_{D,p} T \frac{m}{M}}.$$

If P point targets and K transmit antennas are considered, a signal of the $l^{th}$ receive antenna may be represented as $$y_{l,n}(m) =$$

$$\sum_{k=0}^{K-1} \sum_{p=1}^{P} h''_p(\tau_p, m)[a_R(\theta_p)]_l [a_T^T(\theta_p)]_k \times \left[ d_k \boxtimes_{K_f K_t} c_k \right]_{n,m} e^{-j2\pi m \Delta f \tau_p} e^{j2\pi f_{D,p} nT_{sym}}$$

If the orthogonal sequence $c^*_k$ performs inverse spectrum spreading on each $K_f \times K_t$ time frequency domain block, a signal on each transmit antenna is orthogonally separated. Therefore, after considering receiving noise, a signal transmitted by the $k^{th}$ transmit antenna and received by the $l^{th}$ receive antenna may be represented as:

$$y'_{k,l,n'}(m') = \sum_{p=1}^{P} h''_p(\tau_p, m')[a_R(\theta_p)]_l [a_T^T(\theta_p)]_k \times [d_k]_{n',m'} e^{-j2\pi m' \Delta f \tau_p} \cdot e^{j2\pi f_{D,p} n' T_{sym}} + z_{k,l,n'}(m')$$

$z_{k,l,n}(m')$ is AWGN (Additive White Gaussian Noise) noise received on the $l^{th}$ receive antenna, the m' subcarrier, and the n' symbol after orthogonal sequence $c^*_k$ performs inverse spectrum spreading processing. An average value is zero and a noise power spectral density is $N_0$ $$m' = \left\lfloor \frac{m}{K_f} \right\rfloor, \text{ and } n' = \left\lfloor \frac{n}{K_t} \right\rfloor.$$

Therefore, $y'_{k,l,n}(m')$ is used as an input signal, and detects and obtains the DoA (namely, $\theta_p$), the range (namely, $\tau_p$), and the Doppler frequency shift (namely, $f_{D,p}$) related to the P point target. Different algorithms are considered to be used to separately obtain the DoA, the range, and the Doppler frequency shift.

It should be understood that the foregoing $y'_{k,l,n}(m')$ processing process is the same for the TS entity and the CO entity. The only difference is that receive antenna vectors $a_R(\theta_p)$ of the TS entity and the CO entity are separately defined, and objects of the reflection objects are also different.

In addition, for the CO entity, after obtaining $y'_{k,l,n}(m')$, the specific required data detection algorithm is exactly the same as a method of a conventional OFDM receiver. This is not described in detail herein.

Optionally, because the TS entity is the data signal $[d_k]_{n',m'}$ that is known and that is transmitted on each transmit antenna, the TS entity may be removed from the received signal $y'_{k,l,n}(m')$. The received signal of the $k^{th}$ transmit antenna and the $l^{th}$ receive antenna after a division operation is performed may be represented as:

$$y''_{k,l,n'}(m') = \sum_{p=1}^{P} h''_p(\tau_p, m')[a_R(\theta_p)]_l [a_T^T(\theta_p)]_k \times e^{-j2\pi m' \Delta f \tau_p} \cdot e^{j2\pi f_{D,p} n' T_{sym}} + z'_{k,l,n'}(m') z'_{k,l,n'}(m') = \frac{z_{k,l,n'}(m')}{[d_k]_{n',m'}}.$$

To obtain the DoA, the Capon method or MUSIC-related algorithms may be considered to be used. In a process of the Capon method or MUSIC-related algorithms, a spatial covariance matrix of the received signal needs to be first constructed. Two spatial diversity operation methods are considered.

A first spatial diversity operation method is to only consider receive antenna diversity in a case that the received SNR is relatively low. In other words, through the received signal $y''_{k,l,n}(m')$, a matrix M×K is formed, and a matrix form may be represented as:

$$Y^{(1)}_{k,n'} = [y_{k,1,n'}, y_{k,2,n'}, \ldots, y_{k,L,n'}].$$

$$y_{k,l,n'} = \left[ y''_{k,l,n'}(0), y''_{k,l,n'}(1), \ldots, y''_{k,l,n'}\left(\left\lfloor \frac{M}{K_f} \right\rfloor - 1\right) \right]^T.$$

By calculating the spatial covariance matrix of $Y_{k,n}^{(1)}$, a spatial covariance matrix $R^{(1)}$ of L×L may be obtained, and is represented as:

$$R^{(1)} \cong \sum_{k=1}^{K} \sum_{n'=0}^{\lfloor N/K_t \rfloor - 1} [Y^{(1)}_{k,n'}]^H Y^{(1)}_{k,n'}.$$

A second spatial diversity operation method is to simultaneously consider transmit antenna diversity and receive antenna diversity in a case that the received SNR is relatively high. In other words, through the received signal $y''_{k,l,n}(m')$, a matrix M×KL is formed, and a matrix form may be represented as:

$$Y^{(2)}_{n'} = [y_{1,1,n'}, y_{1,2,n'}, \ldots, y_{1,L,n'}; \ldots; y_{K,1,n'}, y_{K,2,n'}, \ldots, y_{K,L,n'}].$$

$$y_{k,l,n'} = \left[ y''_{k,l,n'}(0), y''_{k,l,n'}(1), \ldots, y''_{k,l,n'}\left(\left\lfloor \frac{M}{K_f} \right\rfloor - 1\right) \right]^T.$$

By calculating the spatial covariance matrix of $Y_n^{(2)}$, a spatial covariance matrix $R^{(2)}$ of KL×KL may be obtained, and is represented as:

$$R^{(2)} \cong \sum_{n'=0}^{\lfloor N/K_t \rfloor - 1} [Y^{(2)}_{n'}]^H Y^{(2)}_{n'}.$$

The spatial covariance matrix $R^{(1)}$ or $R^{(2)}$ may be used as an input by the Capon method or MUSIC-related algorithms, to obtain the DoA, namely, $\theta_p$.

Optionally, a difference between algorithms of the spatial covariance matrix $R^{(1)}$ or $R^{(2)}$ is that the former obtains an SNR gain from the transmit antenna, which greatly improves accuracy of obtaining the DoA, but the latter increases a quantity of objects that may be sensed due to a diversity gain in space domain.

Optionally, to obtain the range information and the Doppler frequency shift information, an OFDM radar algorithm is considered to be used. To more accurately obtain the range and the Doppler frequency shift, based on the estimated spatial covariance matrix R(1) of $\hat{\theta}_p$ and L×L obtained before, $a'(\hat{\theta}_1, \hat{\theta}_2, \ldots, \hat{\theta}_P)$ is calculated by using the MVDR method, and receiving beamforming is performed on the signal $Y_{k,n}^{(1)}$. Therefore, through a matrix operation, a vector M×1 may be obtained:

$$y_n^{(3)} = \Sigma_{k=1}^{K} Y_{k,n}^{(1)} a'_R(\hat{\theta}_1, \hat{\theta}_2, \ldots, \hat{\theta}_P).$$

Optionally, a signal that is obtained after beamforming processing is performed may represent $$Y^{(3)} = \left[ y_0^{(3)}, y_1^{(3)}, \ldots, y_{\lfloor N/K_t \rfloor - 1}^{(3)} \right]$$

in a matrix form $$\left\lfloor \frac{M}{K_f} \right\rfloor \times \left\lfloor \frac{N}{K_t} \right\rfloor$$

$$Y^{(3)} = \left[ y_0^{(3)}, y_1^{(3)}, \ldots, y_{\left\lfloor \frac{N}{K_t} \right\rfloor - 1}^{(3)} \right].$$

Therefore, the matrix $Y^{(3)}$ is used as an input of an OFDM radar algorithm module, to obtain the range and the Doppler frequency shift.

Figure 7:
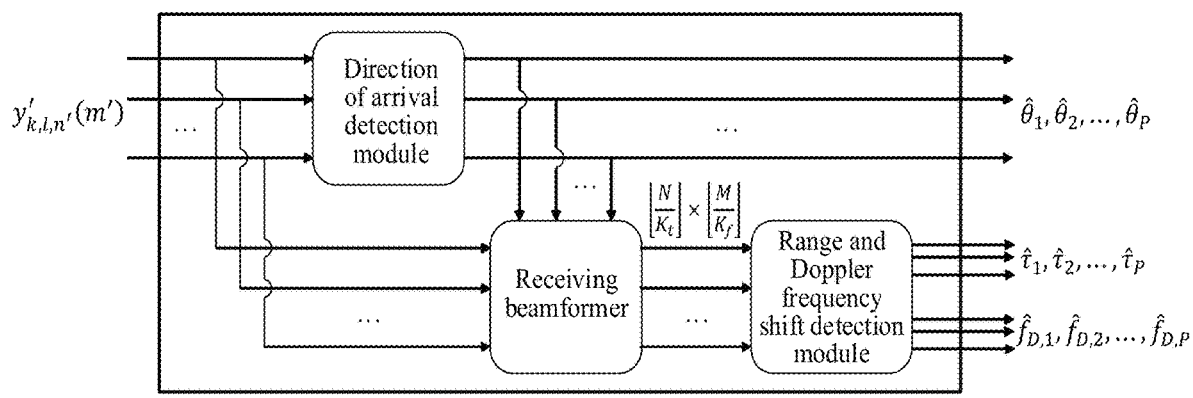
FIG. 7 is an example diagram of a detection flow of a DoA, a range, and a Doppler frequency shift in a data transmission processing method according to an embodiment of this application.

Specifically, as shown in FIG. 7, a specific process of detection is as follows: The processed received signal $y''_{k,l,n}(m')$ is input into a DoA detection module, and the DoA of P targets is obtained through algorithms such as MUSIC. The obtained DoA through estimation is input into a receiving beamforming module, to perform receiving beamforming processing. A matrix signal $$\left\lfloor \frac{M}{K_f} \right\rfloor \times \left\lfloor \frac{N}{K_t} \right\rfloor$$

obtained by beamforming processing is input into a range and Doppler frequency shift detection module, and finally the range and the Doppler frequency shift are obtained through the OFDM radar algorithm.

Solution 4: New Waveform Dynamic Control.

The orthogonal CDM radar waveform may be used to detect an unknown target location. However, due to CDM spectrum spreading, there is a specific limit on a peak value of a data rate. Although CDM spectrum spreading may provide a corresponding SNR gain, and indirectly increase a data rate, this requires increasing a modulation order of QAM. However, an extremely high modulation order may affect performance of the radar waveform. Therefore, this application considers two waveforms to simultaneously implement improving of radar performance and data transmission performance.

Figure 8:
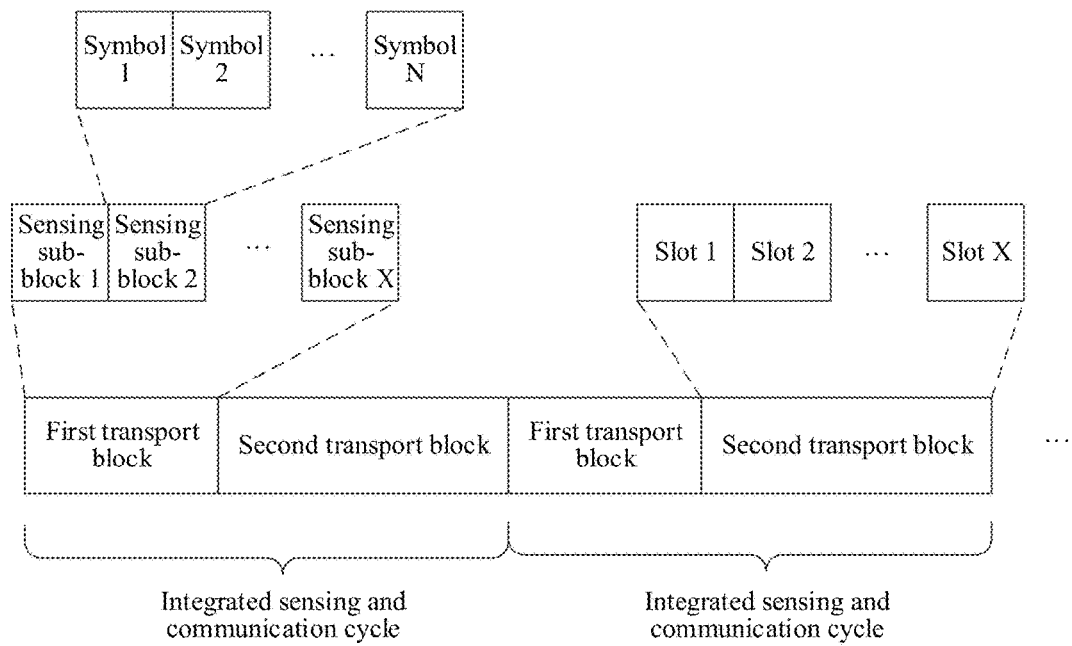
FIG. 8 is a schematic flowchart 3 of a data transmission processing method according to an embodiment of this application.

As shown in FIG. 8, two types of OFDM transport blocks are considered to implement dynamic switching or scheduling of sensing and communication waveforms. The two OFDM transport blocks are periodically and alternately used. In other words, the TS entity may first transmit a MIMO OFDM radar signal based on orthogonal CDM in a Type-I block, to detect an unknown target. Then the TS entity is periodically switched to a Type-II block, to send a conventional MIMO OFDM data signal. A sensing and communication process of each Type-I block and Type-II block is considered as an ISAC cycle.

Optionally, the Type-I block uses a newly designed waveform based on OFDM. The waveform relies on a CDM manner, to cause transmission signals on different antennas to be orthogonal to each other. The use of the Type-I block mainly aims to improve the sensing performance, but also guarantees the data transmission performance to a certain extent. In the sensing process, the solution 3 is used to obtain the DoA, the range, and the Doppler (or velocity) of a plurality of targets.

Optionally, the Type-II block uses a classic OFDM waveform, where transmission relies on single-user MIMO or multi-user MIMO, and beamforming is performed based on the DoA obtained in the Type-I block. The use of the Type-II block mainly aims to improve the data performance rather than the sensing performance. Because an accurate DoA may be obtained in the Type-I block, thereby guaranteeing beamforming accuracy, beam interference between multi-user MIMO may be suppressed accordingly. The sensing performance in the Type-II block may also be guaranteed to a certain extent.

It should be understood that in the Type-II block, the TS entity also needs to implement a radar detection process by receiving the MIMO OFDM data signal. Because communication symbols between any two transmit antennas of the TS entity are not orthogonal, the radar detection performance cannot be guaranteed. In this case, the radar detection process may only be used as a supplemental function, and implementation of an accurate radar detection process relies on the Type-I block.

In FIG. 8, it is assumed that each Type-I block includes X sensing sub-blocks (SSB). The sensing sub-blocks may be referred to as synchronization blocks. Each sensing sub-block includes N OFDM symbols. Each Type-II block includes Y slots. X and Y may be configured in RRC. The use of the Type-I block and the Type-II block may be periodically and alternately switched, to form an ISAC cycle. More effectively, the use of the Type-I block and the Type-II block may also be switched in a signaling transmitting method.

Generally, there are two types of reflected targets. One is a RO entity, and the other is a CO entity. It is first assumed that the TS entity has the capability to distinguish between the RO entity and the CO entity.

In the Type-I block, the TS entity detects a target (such as a target with a greater volume and a less range) with a greater feature value, and obtains the related DoA, range, and Doppler. In the Type-II block, the TS entity focuses on communication terminals, namely, the CO entities, giving the communication terminals a more concentrated beam and greater energy, and ensuring QoS of these communication terminals. In the Type-II block, because a quantity P' of beams on which the transmit end may perform beamforming needs to be met, $P' \leq K-1$. In addition, a transmit power is limited due to reasons such as power amplifier hardware. Therefore, in the Type-II block, how to better meet a QoS requirement required by the CO entity needs to be first considered. Only when the TS entity has remaining available shaped beams and/or energy for the RO entity, the TS entity selects the DoA to perform beamforming on the RO entity. In this case, in different time periods, a beamforming direction that has a communication target remains unchanged, but a direction of the sensing target beam may be switched from one to another. This is because if the TS entity uses a greater quantity of beams for sensing, this has a negative impact on the communication performance. For example, when a greater quantity of total beams is used for beamforming, accuracy of data beamforming decreases. Further, the more beams used to sense a target, the less energy is used for data, and the data communication received signal becomes weaker; and in other words, SNR cannot meet a communication requirement.

However, to implement the foregoing dynamic optimization control, the key lies in how the TS entity distinguishes the RO entity and the CO entity. In the Type-I block, the TS entity at the transmit end transmits an orthogonal CDM radar wave, and simultaneously carries data. When the CO entity at the receive end receives a related data packet, the CO entity at the receive end needs to feed back reception success information of the data packet to the TS entity at the transmit end. In addition, the CO entity may notify the TS entity of a geographical location of the CO entity through control signaling. The TS entity may comprehensively determine which entities belong to the CO entity and which entities belong to the RO entity according to all parameters detected in the Type-I block. For example, the TS entity may calculate general coordinates of the CO entity by using an azimuth angle and range information, and calculate whether the reflector belongs to the CO entity by comparing the azimuth angle and range information with the feedback geographical location information.

Generally, the CO entity may send a geographical location of the CO entity to the TS entity through PUSCH, MAC-CE, or higher layer signaling and with reference to feedback information. For a low-speed CO entity, generally, the higher layer signaling is sufficient to ensure delivery of the geographical location.

Optionally, in the Type-II block, because the TS entity knows that the DoA and the CO entity related to the CO entity only need to feed back a rank indicator (RI) and a channel quality indicator (CQI), and do not need to feed back a precoding matrix indicator (PMI). Because feedback of the PMI requires a large amount of signaling overhead to support, this can alleviate the signaling overhead for multi-user MIMO.

Solution 5: Design for a MIMO-OFDM Waveform in the Type-II Block.

When designing the MIMO-OFDM waveform in the Type-II block, the TS entity needs to consider how many MIMO layers are generated. In a conventional MIMO-OFDM system, if I MIMO layers may be provided to the transmit end, the transmit end needs to decide I precoding, to send independent data packets on each MIMO layer. Therefore, a maximum amount of data that a MIMO system may transmit is determined by I MIMO layers.

The MIMO-OFDM transmission method in the Type-II block is different from the conventional MIMO-OFDM transmission method. On each MIMO layer, in addition to transmitting the data packet, the TS entity also needs to consider sensing the RO entity. Therefore, when beamforming is performed on each MIMO layer, the azimuth angles of the CO entity and the RO entity need to be simultaneously considered. In other words, the TS entity considers performing multi-directional beamforming on each MIMO layer. According to the azimuth angles of the CO entity and the RO entity, and through the MVDR algorithm, the TS entity determines to perform multi-directional beamforming on each MIMO layer. In each MIMO layer, a quantity of beamformed beams oriented to the CO entity is one, and a quantity of beamformed beams oriented to the RO entity may be more than one. A specific quantity is controlled by the TS entity.

Optionally, for MIMO-OFDM transmission in the Type-II block, only data packets oriented to the CO entity need to be transmitted on the shaped beam.

Optionally, the TS entity transmits independent data packets on different MIMO layers. The transmitted data packets may be for a single user or for a plurality of users. But beamforming on different MIMO layers may be for different RO entities. This may reduce mutual interference between beams as a whole, to improve performance of the TS entity in sensing a reflector. This is because the data signals transmitted between MIMO-OFDM beams are not completely orthogonal.

For the solution 2, specific examples are described below with reference to FIG. 9 to FIG. 11.

Figure 9:
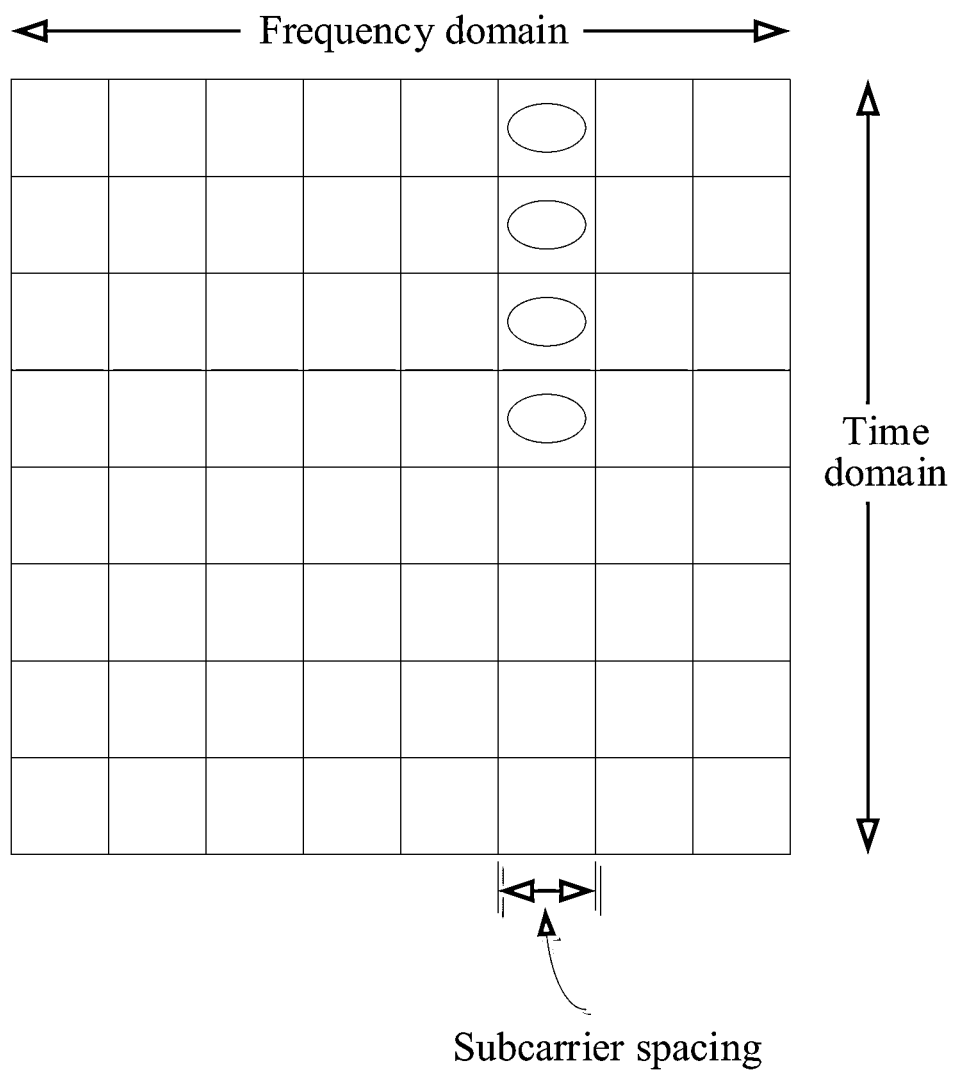
FIG. 9 is an example diagram 1 of spectrum spreading of a data transmission processing method according to an embodiment of this application.

As shown in FIG. 9, a CDM spreading factor is 4. CDM spectrum spreading only uses a mapping manner in a time domain direction, to be specific, $K_f=1$, and $K_t=4$. In other words, one orthogonal sequence $c_k$ performs spectrum spreading on each data symbol $s_k$ in the time domain direction. After inverse spectrum spreading is performed on the receive end through $c^*_k$, symbols $s_k$ transmitted from different transmit antennas are orthogonal, and do not interfere with each other.

Figure 10:
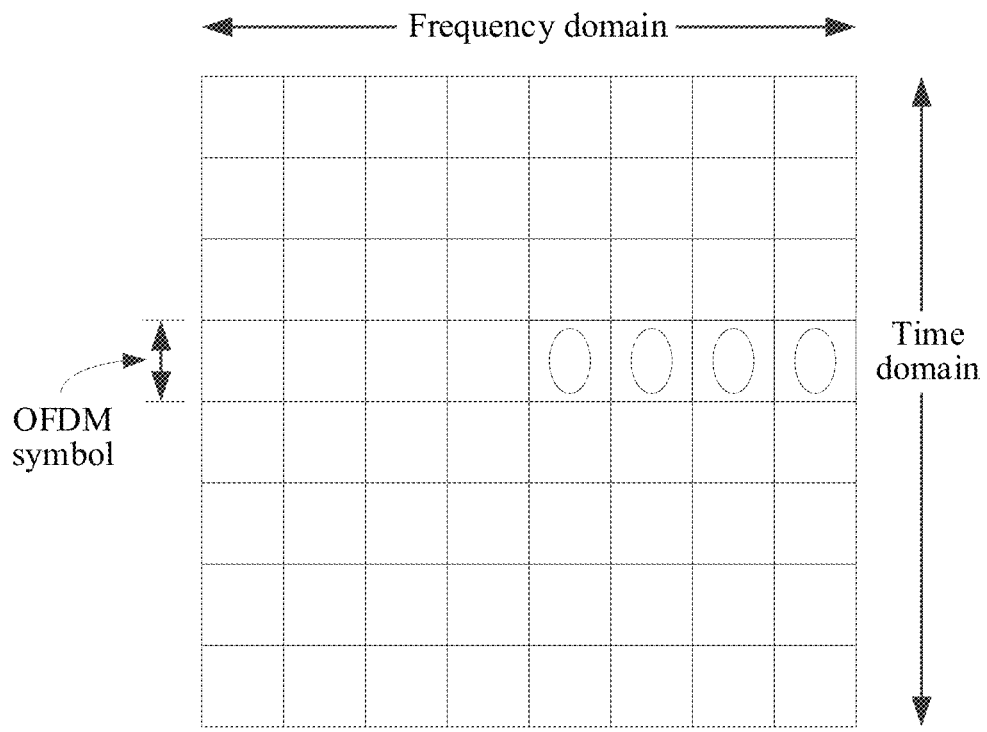
FIG. 10 is an example flowchart 2 of spectrum spreading of a data transmission processing method according to an embodiment of this application.

As shown in FIG. 10, CDM spectrum spreading may also only use a mapping manner in a frequency domain direction, namely, $K_t=1$, and $K_f=4$. In other words, one orthogonal sequence $c_k$ performs spectrum spreading on each data symbol $s_k$ in the frequency domain direction.

Figure 11:
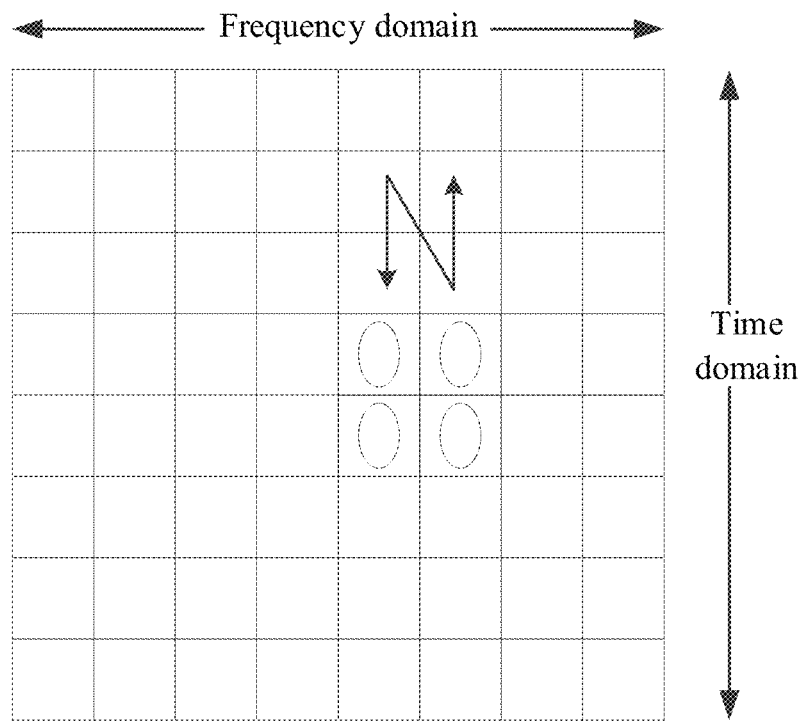
FIG. 11 is an example flowchart 3 of spectrum spreading of a data transmission processing method according to an embodiment of this application.

As shown in FIG. 11, CDM spectrum spreading may also use a mapping manner in a time domain direction and a frequency domain direction, namely $K_t=2$, and $K_f=2$. In other words, one orthogonal sequence $c_k$ simultaneously performs spectrum spreading on each data symbol $s_k$ in the time domain direction and the frequency domain direction. For example, a mapping order of orthogonal sequences may be time domain first and then frequency domain; and in addition, in other embodiments, a mapping order of the orthogonal sequences may also be in an opposite mapping order, that is, frequency domain first and then time domain.

Figure 12:
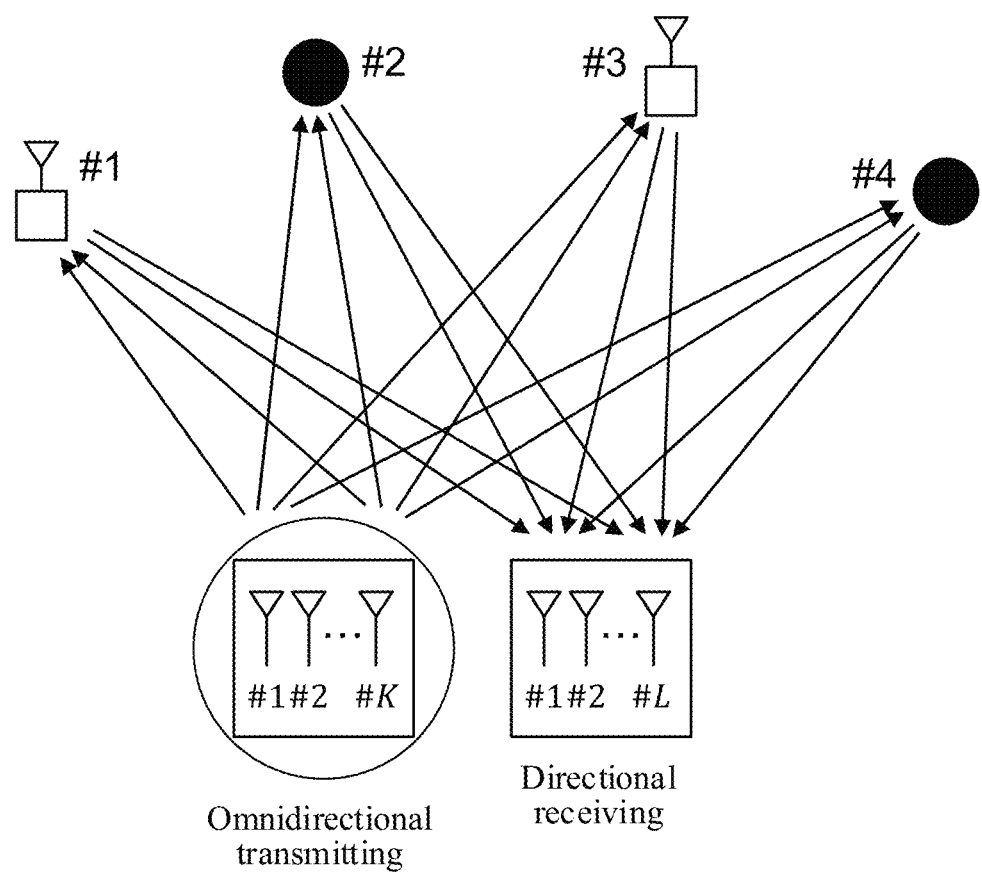
FIG. 12 is an example flowchart 4 of a data transmission processing method according to an embodiment of this application.

For the solution 4, specific examples are described below with reference to FIG. 12 and FIG. 13.

By configuring related parameters of different Type-I blocks and Type-II blocks, an objective of sensing and communication may be effectively and simultaneously achieved.

Specifically, one TS entity, two CO entities (#1 reflector and #3 reflector), and two RO entities (#2 reflector and #4 reflector) may be considered. As shown in FIG. 12, in the Type-I block, the TS entity transmits an orthogonal CDM-MIMO OFDM radar wave. Therefore, beamforming is not performed on a transmit signal on each transmit antenna, instead beamforming is performed on an omnidirectional radar wave signal. The radar wave reaches different reflectors and is reflected to the TS entity. The TS entity receives the reflected wave by using subspace algorithms such as MUSIC, performs processing on the received signal, and obtains the DoA, the range, and the Doppler frequency shift related to the reflector. In addition, the TS entity deduces that the reflector #1 and the reflector #3 belong to the CO entity by using an azimuth angle and range information according to data feedback (such as the geographical location of the CO entity, and the like) of the two CO entities.

Figure 13:
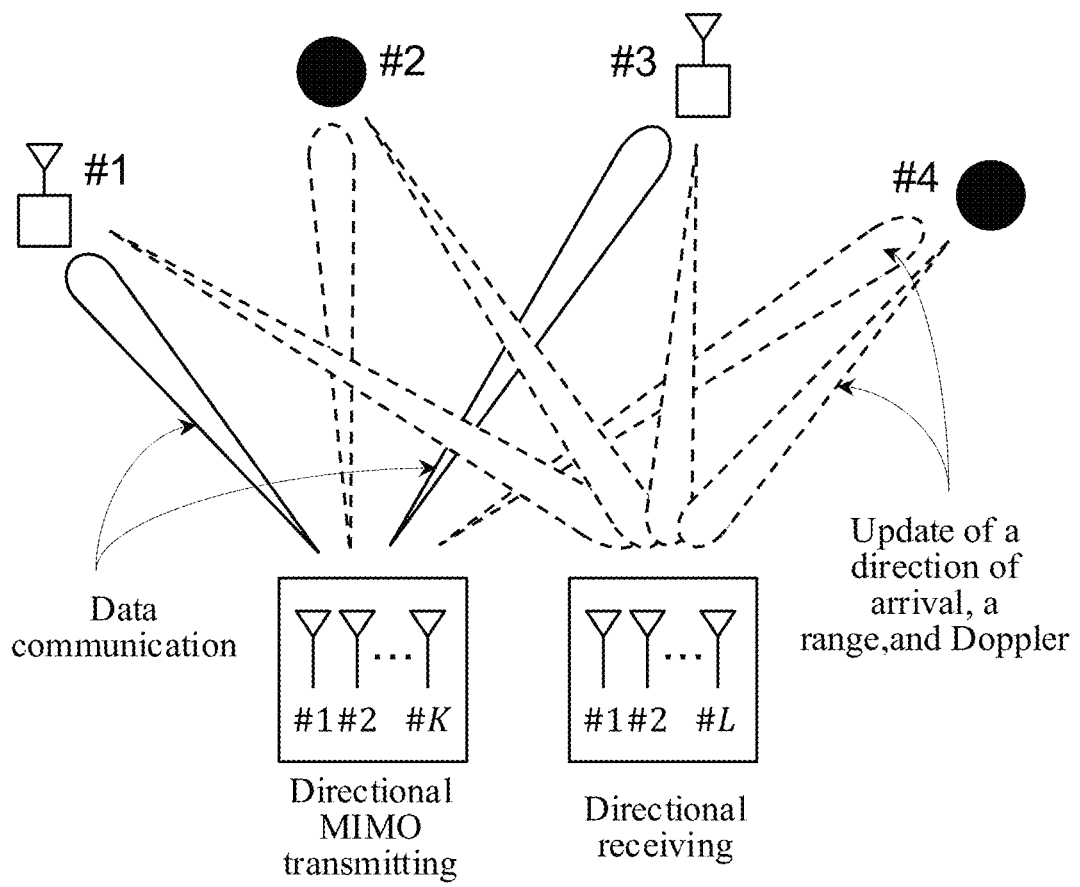
FIG. 13 is an example flowchart 5 of a data transmission processing method according to an embodiment of this application.

As shown in FIG. 13, in the Type-II block, according to the obtained detection information and a type of a reflector, the TS entity performs beamforming on each reflector direction, and transmits a data packet. When performing beamforming on the reflector, the TS entity first considers the CO entity, and performs beamforming on the CO entity. Only in a case that QoS of the CO entity is ensured, the TS entity considers performing beamforming on the RO entity. The CO entity #1 and the CO entity #3 decode the data packet by using the conventional OFDM receiving algorithm, and then perform data feedback. The TS entity receives reflected waves in a manner of beamforming, performs processing on the received signal, and obtains the DoA, the range, and the Doppler frequency shift related to the reflector. It should be understood that the obtained information is for an objective of updating the DoA, the range, and the Doppler frequency shift, to compensate for errors caused by mobility of the reflector in the Type-II block.

For the solution 5, specific examples are described below with reference to FIG. 14 and FIG. 15.

Figure 14:
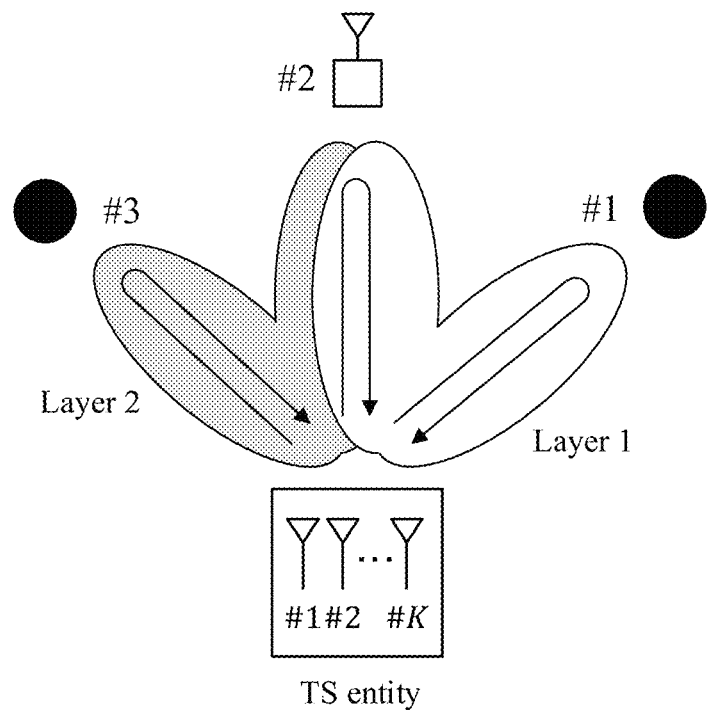
FIG. 14 is an example flowchart 6 of a data transmission processing method according to an embodiment of this application.

As shown in FIG. 14, an SU-MIMO scenario is first considered. In the scenario, one TS entity, one CO entity (reflector #2), and two RO entities (reflector #1 and reflector #3) are considered. The TS entity transmits the MIMO data packet to the CO entity (reflector #2), and also senses the DoA, the range, and the Doppler frequency shift of the reflector through the reflected signal from the reflector #2. In addition, the TS entity further needs to sense two RO entities (reflector #1 and reflector #3). Transmitting of MIMO data packets of the TS entity is completed through two MIMO layers. Therefore, the TS entity only considers sensing one RO entity (reflector #1 or reflector #3) when transmitting data packets on each MIMO layer.

Specifically, when transmitting data packets on a first MIMO layer (Layer-1), the TS entity performs beamforming on two beams, one directed at the CO entity (reflector #2), and the other directed at the RO entity (reflector #1). To ensure communication quality for the CO entity, the TS entity may select to direct most of the energy of the shaped beam at the CO entity, and a small part of the energy of the remaining beam is directed at the RO entity (reflector #1).

Optionally, beamforming performed on the TS entity may be implemented through algorithms such as MVDR. In a case that an azimuth angle of an entity is known, the TS entity may accurately shape beams directed at different entities.

Similarly, when transmitting data packets on a second MIMO layer (Layer-2), the TS entity performs beamforming on two beams, one directed at the CO entity (reflector #2), and the other directed at the RO entity (reflector #3). To ensure communication quality for the CO entity, the TS entity may select to direct most of the energy of the shaped beam at the CO entity, and a small part of the energy of the remaining beam is directed at the RO entity (reflector #3).

Optionally, the Layer-1 and the Layer-2 on which beamforming is performed are simultaneously directed at the CO entity (reflector #2), and the CO entity may decode the data packet in the conventional MIMO-OFDM detection method. In addition, the TS entity receives echoes reflected by the three reflectors, and obtains the DoA, the range, and the Doppler frequency shift related to the reflectors through a detection algorithm of the MIMO-OFDM radar.

It should be understood that the beam directed at the CO entity (reflector #2) is a MIMO multi-layer signal, but a beam direction is consistent. Therefore, the TS entity may take the MIMO multi-layer signal as a radar signal. In other words, for the radar, the Layer-1 and the Layer-2 have no interference with each other.

In addition, it is worth noting that there is specific independence between a beam signal in the Layer-1 and a beam signal in the Layer-2 that are directed at the RO entity (reflector #1). Therefore, as far as the radar is concerned, an interference effect of the Layer-2 on the Layer-1 should be relatively small. In this way, sensing performance of the TS entity on the RO entity (reflector #1) may be improved.

Similarly, an interference effect of the Layer-1 on the Layer-2 should be relatively small. In this way, sensing performance of the TS entity on the RO entity (reflector #3) may be improved.

Optionally, the TS entity may arrange and distinguish the CO entity and the RO entity, select an entity with a relatively small interference effect, pair the CO entity and the RO entity, and perform beamforming on the CO entity and the RO entity, thereby reducing mutual interference between MIMO layers.

Therefore, the SU-MIMO data packet is transmitted in the Type-II block, which may ensure diversity performance of MIMO for the CO entity, and may ensure the sensing performance of all reflectors for the TS entity.

Figure 15:
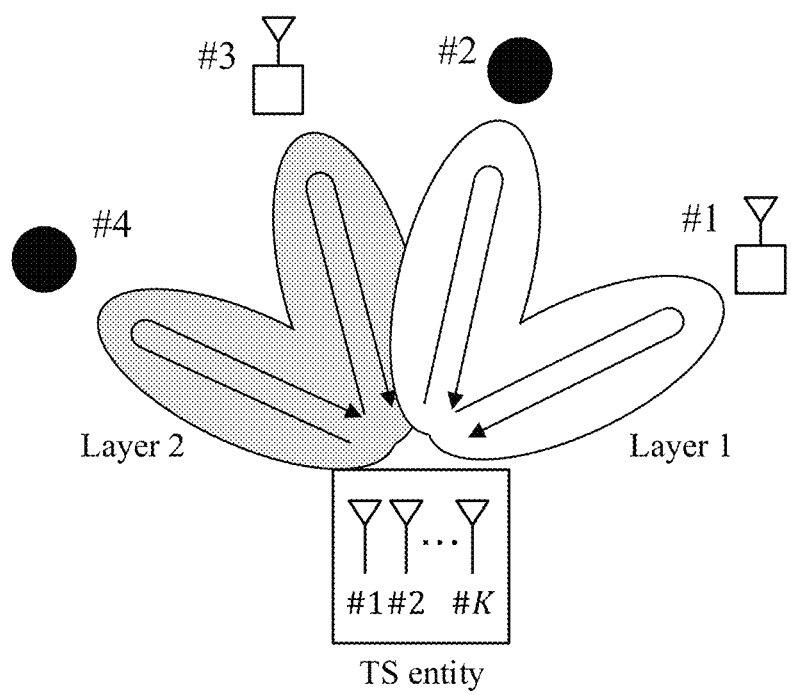
FIG. 15 is an example flowchart 7 of a data transmission processing method according to an embodiment of this application.

As shown in FIG. 15, a MU-MIMO scenario is considered. In the scenario, one TS entity, two CO entities (reflector #1 and reflector #3), and two RO entities (reflector #2 and reflector #4) are considered. The TS entity transmits the MIMO data packet to the CO entities (reflector #1 and reflector #3), and also senses the DoA, the range, and the Doppler frequency shift of the reflector through the reflected signal from the reflector #1 and the reflector #3. In addition, the TS entity further needs to sense two RO entities (reflector #2 and reflector #4). Transmitting of the MIMO data packet of the TS entity is completed through two MIMO layers. Therefore, when transmitting the data packet on each MIMO layer, the TS entity takes into account sensing one RO entity when being directed at the CO entity.

Specifically, when transmitting data packets on a first MIMO layer (Layer-1), the TS entity performs beamforming on two beams, one directed at the CO entity (reflector #1), and the other directed at the RO entity (reflector #2). To ensure communication quality for the CO entity, the TS entity may select to direct most of the energy of the shaped beam at the CO entity (reflector #1), and a small part of the energy of the remaining beam is directed at the RO entity (reflector #2).

Similarly, when transmitting a data packet on a second MIMO layer (Layer-2), the TS entity performs beamforming on two beams, one directed at the CO entity (reflector #3), and the other directed at the RO entity (reflector #4). To ensure communication quality for the CO entity, the TS entity may select to direct most of the energy of the shaped beam at the CO entity (reflector #3), and a small part of the energy of the remaining beam is directed at the RO entity (reflector #4).

Optionally, the Layer-1 and the Layer-2 on which beamforming is performed are simultaneously directed at different CO entities (reflector #1 and reflector #3), and the CO entity may decode the data packet in the conventional MIMO-OFDM detection method. In addition, the TS entity receives echoes transmitted by the four reflectors, and obtains the DoA, the range, and the Doppler frequency shift related to the reflectors through a detection algorithm of the MIMO-OFDM radar.

It should be understood that beams directed at different CO entities (reflector #1 and reflector #3) are MIMO multi-layer signals, and have certain interference with each other. Therefore, when the TS entity uses the MIMO multi-layer signal as the radar signal, mutual interference between MIMO layers has a specific adverse impact on radar sensing.

What is the same as SU-MIMO is that there is specific independence between a beam signal in the Layer-1 and a beam signal in the Layer-2 that are directed at the RO entity (reflector #2). Therefore, as far as the radar is concerned, an interference effect of the Layer-2 on the Layer-1 should be relatively small. In this way, sensing performance of the TS entity on the RO entity (reflector #2) may be improved.

Similarly, an interference effect of the Layer-1 on the Layer-2 should be relatively small. In this way, sensing performance of the TS entity on the RO entity (reflector #4) may be improved.

Optionally, the TS entity may also arrange and distinguish the CO entity and the RO entity, select an entity with a relatively small interference effect, pair the CO entity and the RO entity, and perform beamforming on the CO entity and the RO entity, thereby reducing mutual interference between MIMO layers. However, compared with SU-MIMO, a degree of freedom of pairing is worse. This is because CO entities related to MU-MIMO cannot be selected.

The MU-MIMO data packet is transmitted in the Type-II block, which may ensure diversity performance of MIMO for the CO entity, and may ensure the sensing performance of the RO reflector for the TS entity, but has a specific impact on the sensing performance of the CO entity.

Figure 16:
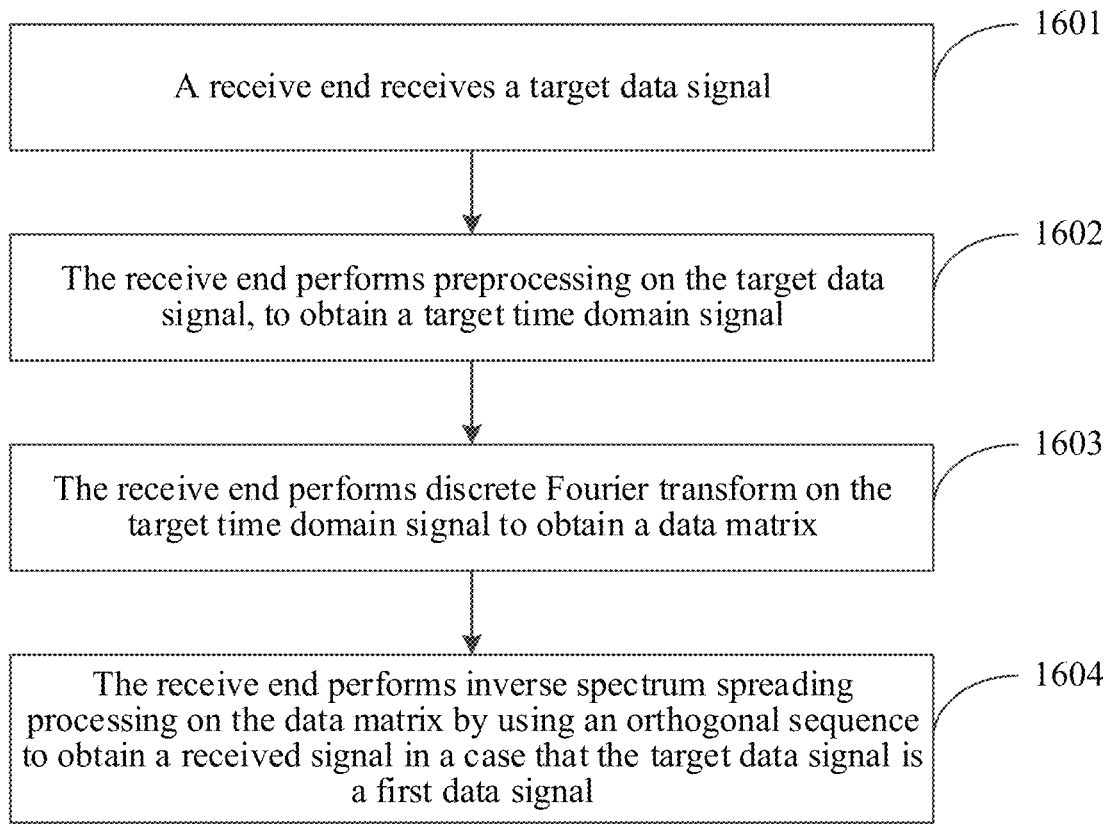
FIG. 16 is a flowchart of another data transmission processing method according to an embodiment of this application.

FIG. 16 is a flowchart of another data transmission processing method according to an embodiment of this application. As shown in FIG. 16, the method includes the following steps:

step 1601: A receive end receives a target data signal;

step 1602: The receive end performs preprocessing on the target data signal, to obtain a target time domain signal;

step 1603: The receive end performs discrete Fourier transform on the target time domain signal to obtain a data matrix; and step 1604: The receive end performs inverse spectrum spreading processing on the data matrix by using an orthogonal sequence to obtain a received signal in a case that the target data signal is a first data signal, where the data matrix is an orthogonal data matrix in a case that the target data signal is the first data signal.

Optionally, after the performing, by the receive end by using an orthogonal sequence, inverse spectrum spreading processing on the data matrix to obtain a received signal, the method further includes:

performing, by the receive end, direction of arrival DoA detection on the received signal, to obtain a target DoA;

performing, by the receive end according to the target DoA, receiving beamforming processing, to obtain a received matrix signal; and calculate, by the receive end by using an OFDM radar algorithm, the received matrix signal, to obtain a range and a Doppler frequency shift.

Optionally, the performing, by the receive end, direction of arrival DoA detection on the received signal, to obtain a target DoA includes:

constructing, by the receive end, a first spatial covariance matrix, where the first spatial covariance matrix is associated with a signal-to-noise ratio;

calculating, by the receive end by using the received signal, the first spatial covariance matrix, to obtain a second spatial covariance matrix; and calculating, by the receive end by using a target algorithm, the second spatial covariance matrix, to obtain the target DoA, where the target algorithm is a Capon algorithm or a MUSIC algorithm.

Optionally, the first spatial covariance matrix meets at least one of the following:

in a case that the signal-to-noise ratio is less than a first preset value, the first spatial covariance matrix is constructed based on a first spatial diversity operation method, and the first spatial diversity operation method is associated with only receive antenna diversity; and in a case that the signal-to-noise ratio is greater than or equal to the first preset value, the first spatial covariance matrix is constructed based on a second spatial diversity operation method, and the first spatial diversity operation method is associated with transmit antenna diversity and the receive antenna diversity.

Optionally, the receiving, by a receive end, a target data signal includes:

alternately receiving, by the receive end, the first data signal transmitted through a first transport block and a second data signal transmitted through a second transport block.

Optionally, the second data signal carries a second time domain signal, and the second time domain signal is obtained based on a conventional multiple input multiple output MIMO orthogonal frequency division multiplexing OFDM manner.

Optionally, the alternately receiving, by the receive end, the first data signal transmitted through a first transport block and a second data signal transmitted through a second transport block includes:

periodically and alternately receiving, by the receive end, the first data signal transmitted through the first transport block and the second data signal transmitted through the second transport block; or receiving, by the receive end according to target switching signaling, the first data signal transmitted through the first transport block and the second data signal transmitted through the second transport block, where the target signaling is used for indicating to receive a data signal through the first transport block or the second transport block.

Optionally, the performing, by the receive end according to the target DoA, receive module beamforming processing, to obtain a received matrix signal includes:

performing, by the receive end according to the target DoA and a minimum variance distortion-free response MVDR method, receiving beamforming processing, to obtain the received matrix signal.

Optionally, after the receiving, by a receive end, a target data signal, the method further includes:

transmitting, by the receive end, feedback information and first indication information to a transmit end, where the feedback information is used for indicating that the first data signal is successfully received, and the first indication information is used for indicating a geographical location of a CO entity.

Optionally, the feedback information and the first indication information are carried on a physical uplink shared channel PUSCH.

Optionally, the first indication information is carried in higher layer signaling.

It should be noted that this embodiment is an implementation of a corresponding receive end in the embodiment shown in FIG. 3. For a specific implementation of this embodiment, refer to related descriptions in the embodiment shown in FIG. 3, and to achieve the same beneficial effect. To avoid repeated descriptions, details are not repeated herein.

It should be noted that in the data transmission processing method provided in embodiments of this application, an execution entity may be a data transmission processing apparatus, or a control module configured to perform data transmission processing in the data transmission processing apparatus. In embodiments of this application, the data transmission processing apparatus performing the data transmission processing is used as an example to describe the data transmission processing apparatus provided in embodiments of this application.

Figure 17:
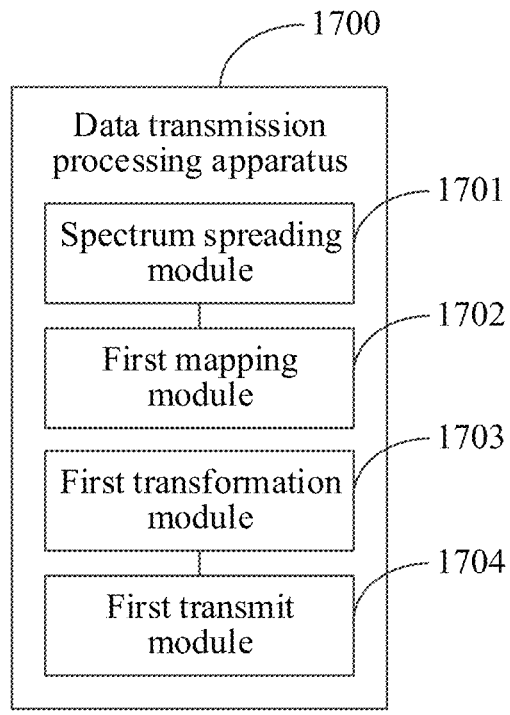
FIG. 17 is a structural diagram of a data transmission processing apparatus according to an embodiment of this application.

FIG. 17 is a structural diagram of a data transmission processing apparatus according to an embodiment of this application. As shown in FIG. 17, the data transmission processing apparatus 1700 includes:

a spectrum spreading module 1701, configured to perform spectrum spreading on to-be-transmitted data through K orthogonal sequences, to obtain K orthogonal data matrices, where K is an integer greater than 1;

a first mapping module 1702, configured to map the K orthogonal data matrices onto different frequency division multiplexing OFDM subcarriers, to obtain K first OFDM signals, where the first OFDM signals are spectrum spreading data matrix OFDM signals;

a first transformation module 1703, configured to perform inverse fast Fourier transform IFFT processing on a $k^{th}$ first OFDM signal among the K first OFDM signals, to obtain a $k^{th}$ first OFDM time domain signal, where k is a positive integer less than or equal to K; and a first transmit module 1704, configured to map the $k^{th}$ first OFDM time domain signal onto a $k^{th}$ transmit antenna, and transmit a first data signal through the $k^{th}$ transmit antenna.

Optionally, the spectrum spreading module 1701 is specifically configured to: perform time-frequency domain spectrum spreading on the to-be-transmitted data through the K orthogonal sequences, to obtain the K orthogonal data matrices, where a rule of the time-frequency domain spectrum spreading meets any of the following:

after time domain spectrum spreading is first performed on $K_t$ OFDM symbols, frequency domain spectrum spreading is performed on $K_f$ subcarriers, both $K_t$ and $K_f$ are positive integers, and a sum of $K_t$ and $K_f$ is greater than 2; and after frequency domain spectrum spreading is first performed on the $K_f$ subcarriers, time domain spectrum spreading is performed on the $K_t$ OFDM symbols, both $K_t$ and Kr are positive integers, and the sum of $K_t$ and $K_f$ is greater than 2.

Optionally, a length K' of the orthogonal sequence meets: $K'=K_tK_f$, and $K' \geq K$.

Optionally, K' is configured or pre-configured through higher layer signaling, or K' is determined based on a quantity of antennas.

Optionally, $K_t$ and $K_f$ are indicated through lower layer signaling.

Optionally, the first mapping module 1702 is further configured to map the to-be-transmitted data onto different OFDM subcarriers, to obtain K" second OFDM signals, where K" is a positive integer less than or equal to K;

the first transformation module 1703 is further configured to perform inverse fast Fourier transform IFFT processing on a $k^{th}$ second OFDM signal among the K" second OFDM signals, to obtain a $k^{th}$ second OFDM time domain signal, where k is a positive integer less than or equal to K"; and the first transmit module 1704 is further configured to map the $k^{th}$ second OFDM time domain signal onto K transmit antennas through multiple input multiple output MIMO precoding or MIMO beamforming, and transmit a second data signal through the K transmit antennas, where the first data signal is carried in a first transport block, the second data signal is carried in a second transport block, and the first transport block and the second transport block are alternately transmitted in time domain.

Optionally, the first data signals transmitted on different antennas are orthogonal to each other.

Optionally, in a case that the second data signal is transmitted through the second transport block, the first transmit module 1704 is further configured to perform beamforming according to a transmission type and a DoA obtained in the first transport block, where the transmission type is single-user MIMO or multi-user MIMO.

Optionally, the first transmit module 1704 is specifically configured to perform beamforming on a communication object CO entity of a receive end according to the transmission type and the DoA obtained in the first transport block; and perform beamforming on a reflection object RO entity of the receive end according to the transmission type and the DoA obtained in the first transport block in a case that quality of service QoS of the CO entity is met, and the transmit end has remaining available shaped beams and/or energy that are used for transmission with the CO entity.

Optionally, the first transmit module 1704 is specifically configured to: determine at least two beam directions of each MIMO layer according to azimuth angles of a CO entity and a RO entity; and perform beamforming on the CO entity and the RO entity in the at least two beam directions for each MIMO layer.

Optionally, in each MIMO layer, a quantity of beamformed beams oriented to the CO entity is one, and a quantity of beamformed beams oriented to the RO entity is at least one.

Optionally, a first beam corresponding to the first data signal and a second beam corresponding to the second data signal meet the following conditions:

the first beam has different beam directions in two adjacent time periods; and the second beam has an unchanged beam direction in different time periods.

Optionally, the first transport block includes X sensing sub-blocks, each sensing sub-block includes N OFDM symbols, and both X and N are positive integers.

Optionally, the second transport block includes Y slots, and Y is a positive integer.

Optionally, the first transmit module 1704 periodically and alternately transmits the first data signal and the second data signal through the first transport block and the second transport block; or transmits the first data signal through the first transport block or transmits the second data signal through the second transport block according to target switching signaling, where the target signaling is used for indicating to transmit a data signal through the first transport block or the second transport block.

Optionally, the data transmission processing apparatus 1700 further includes:

a receive module, configured to receive feedback information and first indication information transmitted by a CO entity of a receive end, where the feedback information is used for indicating that the first data signal is successfully received, and the first indication information is used for indicating a geographical location of the CO entity.

Optionally, the feedback information and the first indication information are carried on a physical uplink shared channel PUSCH.

Optionally, the first indication information is carried in higher layer signaling.

The data transmission processing apparatus provided in embodiments of this application may implement various processes of the method embodiment in FIG. 3, which will not be described in detail herein again to avoid repetition.

Figure 18:
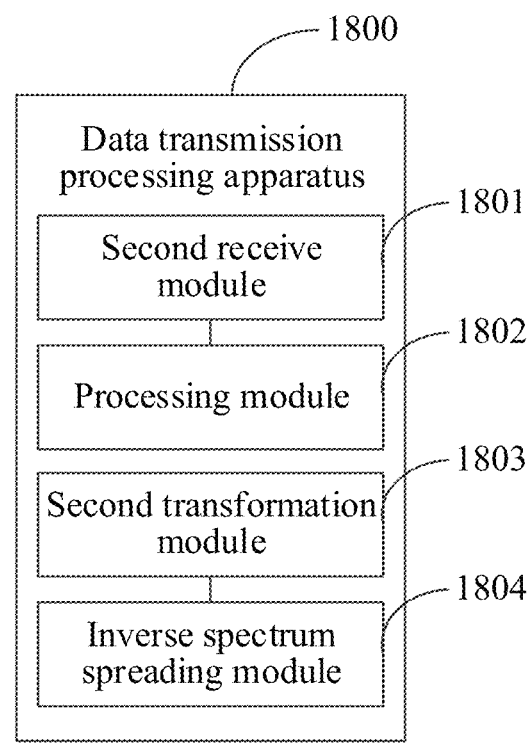
FIG. 18 is a structural diagram of another data transmission processing apparatus according to an embodiment of this application.

FIG. 18 is a structural diagram of a data transmission processing apparatus according to an embodiment of this application. As shown in FIG. 18, the data transmission processing apparatus 1800 includes:

a second receive module 1801, configured to receive, by a receive end, a target data signal;

a preprocessing module 1802, configured to perform, by the receive end, preprocessing on the target data signal, to obtain a target time domain signal;

a second transformation module 1803, configured to perform discrete Fourier transform on the target time domain signal to obtain a data matrix; and an inverse spectrum spreading module 1804, configured to perform, by using an orthogonal sequence, inverse spectrum spreading processing on the data matrix to obtain a received signal when the target data signal is a first data signal, where the data matrix is an orthogonal data matrix in a case that the target data signal is the first data signal.

Optionally, the data transmission processing apparatus 1800 further includes:

a detection module, configured to perform direction of arrival DoA detection on the received signal, to obtain a target DoA;

a beamforming module, configured to perform receiving beamforming processing according to the target DoA, to obtain a received matrix signal; and a calculation module, configured to calculate the received matrix signal by using an OFDM radar algorithm, to obtain a range and a Doppler frequency shift.

Optionally, the detection module is specifically configured to construct a first spatial covariance matrix, where the first spatial covariance matrix is associated with a signal-to-noise ratio; calculate the first spatial covariance matrix by using the received signal, to obtain a second spatial covariance matrix; and calculate the second spatial covariance matrix by using a target algorithm, to obtain a target DoA, where the target algorithm is a Capon algorithm or a MUSIC algorithm.

Optionally, the first spatial covariance matrix meets at least one of the following:

in a case that the signal-to-noise ratio is less than a first preset value, the first spatial covariance matrix is constructed based on a first spatial diversity operation method, and the first spatial diversity operation method is associated with only receive antenna diversity; and in a case that the signal-to-noise ratio is greater than or equal to the first preset value, the first spatial covariance matrix is constructed based on a second spatial diversity operation method, and the first spatial diversity operation method is associated with transmit antenna diversity and the receive antenna diversity.

Optionally, the second receive module 1801 is specifically configured to: alternately receive the first data signal transmitted through a first transport block and a second data signal transmitted through a second transport block.

Optionally, the second data signal carries a second time domain signal, and the second time domain signal is obtained based on a conventional multiple input multiple output MIMO orthogonal frequency division multiplexing OFDM manner.

Optionally, the second receive module 1801 is specifically configured to: periodically and alternately receive the first data signal transmitted through a first transport block and a second data signal transmitted through a second transport block; or receive, according to target switching signaling, the first data signal transmitted through the first transport block and the second data signal transmitted through the second transport block, where the target signaling is used for indicating to receive a data signal through the first transport block or the second transport block.

Optionally, the beamforming module is specifically configured to: perform receiving beamforming processing according to the target DoA and a minimum variance distortion-free response MVDR method, to obtain a received matrix signal.

Optionally, the data transmission processing apparatus 1800 further includes:

a second transmit module, configured to transmit feedback information and first indication information to a transmit end, where the feedback information is used for indicating that the first data signal is successfully received, and the first indication information is used for indicating a geographical location of a CO entity.

Optionally, the feedback information and the first indication information are carried on a physical uplink shared channel PUSCH.

Optionally, the first indication information is carried in higher layer signaling.

The data transmission processing apparatus provided in embodiments of this application may implement various processes of the method embodiment in FIG. 16, which will not be described in detail herein again to avoid repetition.

The data transmission processing apparatus in embodiments of this application may be an apparatus, an apparatus or an electronic device with an operating system, or may be a component, an integrated circuit, or a chip in a terminal. The apparatus may be a mobile terminal, or may be a non-mobile terminal. For example, the mobile terminal may include, but is not limited to, Type of the terminal 11 listed above, and a non-mobile terminal may be a server, a network attached storage (NAS), a personal computer (PC), a television (TV), a cash machine, a self-service machine, or the like, which is not specifically limited in embodiments of this application.

The data transmission processing apparatus provided in embodiments of this application may implement various processes of the method embodiments in FIG. 1 to FIG. 16, and implement the same technical effect, which will not be described in detail herein again to avoid repetition.

Figure 19:
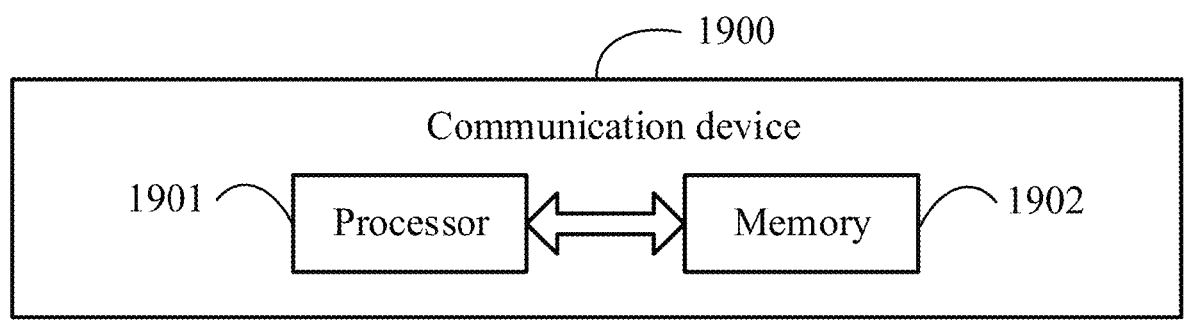
FIG. 19 is a structural diagram of a communication device according to an embodiment of this application.

Optionally, as shown in FIG. 19, embodiments of this application further provide a communication device 1900, including a processor 1901, a memory 1902, and a program or an instruction stored in the memory 1902 and executable on the processor 1901, the program or instruction, when executed by the processor 1901, implements the various processes of the data transmission processing method embodiment, and may implement the same technical effect. To avoid repetition, details are not described herein again.

Figure 20:
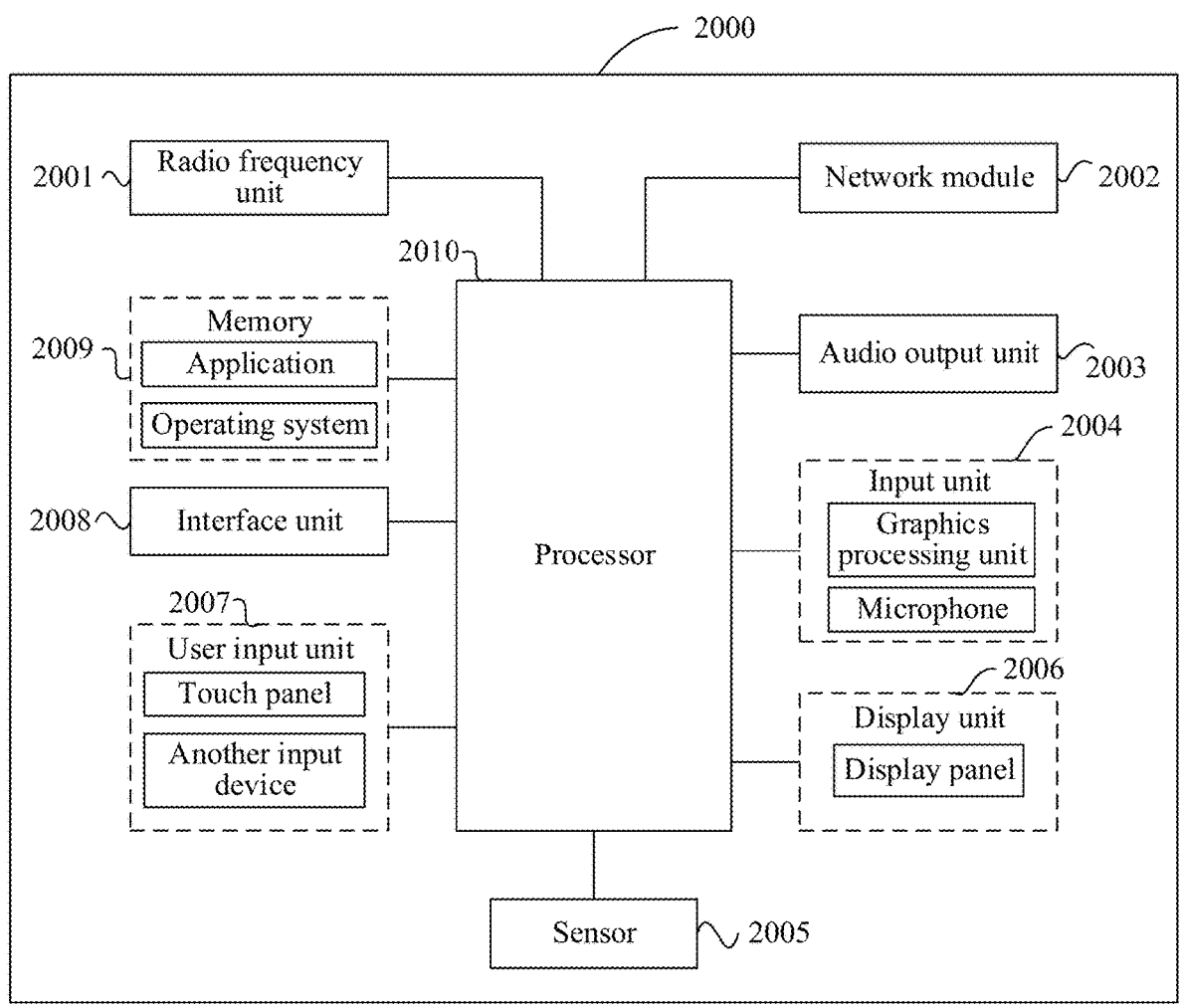
FIG. 20 is a structural diagram of a terminal according to an embodiment of this application.

Embodiments of this application further provide a terminal, including a processor and a communication interface, where the processor is configured to: perform spectrum spreading on to-be-transmitted data through K orthogonal sequences, to obtain K orthogonal data matrices, where K is an integer greater than 1; map the K orthogonal data matrices onto different frequency division multiplexing OFDM subcarriers, to obtain K first OFDM signals, where the first OFDM signals are spectrum spreading data matrix OFDM signals; and perform inverse fast Fourier transform IFFT processing on a $k^{th}$ first OFDM signal among the K first OFDM signals, to obtain a $k^{th}$ first OFDM time domain signal, where k is a positive integer less than or equal to K; and the communication interface is configured to map the $k^{th}$ first OFDM time domain signal onto a $k^{th}$ transmit antenna, and transmit a first data signal through the $k^{th}$ transmit antenna. Alternatively, the communication interface is configured to receive a target data signal, and the processor is configured to: perform preprocessing on the target data signal, to obtain a target time domain signal; perform discrete Fourier transform on the target time domain signal to obtain a data matrix; and perform inverse spectrum spreading processing on the data matrix by using an orthogonal sequence to obtain a received signal when the target data signal is a first data signal, where the data matrix is an orthogonal data matrix in a case that the target data signal is the first data signal. This terminal embodiment corresponds to the terminal side method embodiment. Each implementation process and implementation of the method embodiment may be applied to the terminal embodiment, and may achieve the same technical effect. Specifically, FIG. 20 is a schematic diagram of a hardware structure of a terminal according to an embodiment of this application.

The terminal 2000 includes, but is not limited to, at least a part of components such as a radio frequency unit 2001 a network module 2002, an audio output unit 2003, an input unit 2004, a sensor 2005, a display unit 2006, a user input unit 2007, an interface unit 2008, a memory 2009, and a processor 2010.

A person skilled in the art may understand that the terminal 2000 may further include the power supply (such as a battery) for supplying power to the components. The power supply may be logically connected to the processor 2010 by a power management system, thereby implementing functions such as charging, discharging, and power consumption management by using the power management system. A terminal structure shown in FIG. 20 does not constitute a limitation to the terminal, and the terminal may include more or fewer components than those shown in the figure, or some components may be combined, or a different component deployment may be used, and details are not repeated herein.

It should be understood that, in embodiments of this application, the input unit 2004 may include a graphics processing unit (GPU) and a microphone. The GPU processes image data of a static picture or a video acquired by an image capturing device (for example, a camera) in a video capturing mode or an image capturing mode. The display unit 200 may include a display panel, and the display panel may be configured by using a liquid crystal display, an organic light-emitting diode, or the like. The user input unit 2007 includes a touch panel and another input device. The touch panel is also referred to as a touchscreen. The touch panel may include two parts: a touch detection apparatus and a touch controller. The another input device may include, but not limited to, a physical keyboard, a functional key (such as a volume control key or a switch key), a track ball, a mouse, and a joystick, which are not described herein in detail.

In embodiments of this application, after the radio frequency unit 2001 receives downlink data from the network side device, the downlink data is processed by the processor 2010; and in addition, uplink data is transmitted to the network side device. Generally, the radio frequency unit 2001 includes, but is not limited to, an antenna, at least one amplifier, a transceiver, a coupler, a low noise amplifier, a duplexer, and the like. In addition, the radio frequency circuit may further communicate with another device through wireless communication.

The memory 2009 may be configured to store a software program or an instruction and various data. The memory 2009 may mainly include a program or an instruction storage area and a data storage area. The program or instruction storage area may store an operating system, an application program or instruction required by at least one function (such as a sound playback function and an image display function), and the like. In addition, the memory 2009 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. Such as at least one magnetic disk storage device, a flash storage device, or other non-volatile solid-state storage devices.

The processor 2010 may include one or more processing units. Optionally, the processor 2010 may integrate an application processor and a modem, where the application processor mainly processes an operating system, a user interface, and an application program or instruction, and the modem mainly processes wireless communication, such as a baseband processor. It may be understood that the foregoing modem may either not be integrated into the processor 2010.

The processor 2010 is configured to perform spectrum spreading on to-be-transmitted data through K orthogonal sequences, to obtain K orthogonal data matrices, where K is an integer greater than 1; map the K orthogonal data matrices onto different frequency division multiplexing OFDM subcarriers, to obtain K first OFDM signals, where the first OFDM signals are spectrum spreading data matrix OFDM signals; and perform inverse fast Fourier transform IFFT processing on a $k^{th}$ first OFDM signal among the K first OFDM signals, to obtain a $k^{th}$ first OFDM time domain signal, where k is a positive integer less than or equal to K; and the radio frequency unit 2001 is configured to map the $k^{th}$ first OFDM time domain signal onto a $k^{th}$ transmit antenna, and transmit a first data signal through the $k^{th}$ transmit antenna.

Alternatively, the radio frequency unit 2001 is configured to receive, by a receive end, a target data signal;

the processor 2010 is configured to perform preprocessing on the target data signal, to obtain a target time domain signal; and a second transformation module is configured to perform discrete Fourier transform on the target time domain signal to obtain a data matrix; and perform inverse spectrum spreading processing on the data matrix by using an orthogonal sequence to obtain a received signal when the target data signal is a first data signal, where the data matrix is an orthogonal data matrix in a case that the target data signal is the first data signal.

The processor 2010 and the radio frequency unit 2001 provided in embodiments of this application may implement various steps of the data transmission processing method embodiment, and implement the same technical effect, which will not be described in detail herein again to avoid repetition.

Embodiments of this application further provide a network side device, including a processor and a communication interface, where the processor is configured to: perform spectrum spreading on to-be-transmitted data through K orthogonal sequences, to obtain K orthogonal data matrices, where K is an integer greater than 1; map the K orthogonal data matrices onto different frequency division multiplexing OFDM subcarriers, to obtain K first OFDM signals, where the first OFDM signals are spectrum spreading data matrix OFDM signals; and perform inverse fast Fourier transform IFFT processing on a $k^{th}$ first OFDM signal among the K first OFDM signals, to obtain a $k^{th}$ first OFDM time domain signal, where k is a positive integer less than or equal to K; and the communication interface is configured to map the $k^{th}$ first OFDM time domain signal onto a $k^{th}$ transmit antenna, and transmit a first data signal through the $k^{th}$ transmit antenna. The network side device embodiment corresponds to the network side device method embodiment. Each implementation process and implementation of the method embodiment may be applied to the network side device embodiment, and may achieve the same technical effect.

Figure 21:
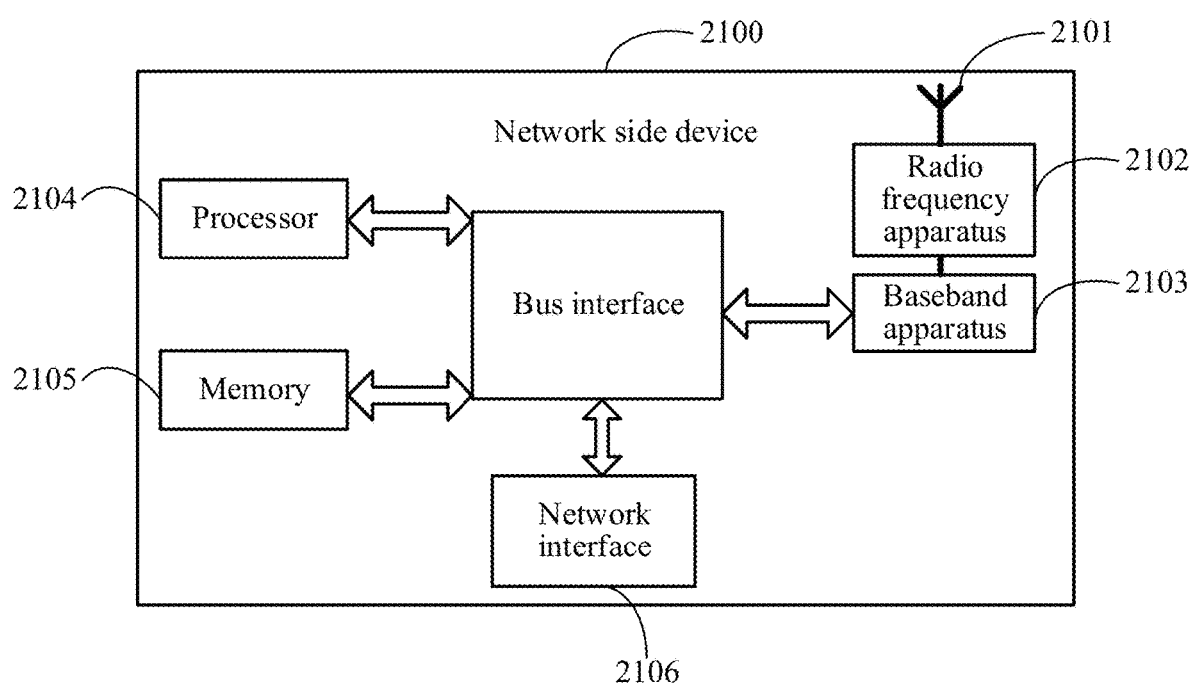
FIG. 21 is a structural diagram of a network side device according to an embodiment of this application.

Specifically, embodiments of this application further provide a network side device. As shown in FIG. 21, the network side device 2100 includes: an antenna 2101, a radio frequency apparatus 2102, and a baseband apparatus 2103. The antenna 2101 is connected to the radio frequency apparatus 2102. In an uplink direction, the radio frequency apparatus 2102 receives information through the antenna 2101, and transmits the received information to the baseband apparatus 2103 for processing. In a downlink direction, the baseband apparatus 2103 performs processing on the to-be-transmitted information, and transmits the to-be-transmitted information to the radio frequency apparatus 2102. After performing processing on the received information, the radio frequency apparatus 2102 transmits the received information out through the antenna 2101.

The frequency band processing apparatus may be located in the baseband apparatus 2103, and the method performed by the network side device in the foregoing embodiment may be implemented in the baseband apparatus 2103. The baseband apparatus 2103 includes a processor 2104 and a memory 2105.

The baseband apparatus 2103 may include, for example, at least one baseband board, and a plurality of chips are arranged on the baseband board. As shown in FIG. 21, for example, one of the chips is a processor 2104, and is connected to the memory 2105, to invoke the program in the memory 2105, and to perform the network side device operation shown in the foregoing method embodiments.

The baseband apparatus 2103 may further include a network interface 2106 used for exchanging information with the radio frequency apparatus 2102. For example, the interface is a common public radio interface (CPRI).

Specifically, the network side device of this embodiment of this application further includes: an instruction or a program stored in the memory 2105 and executable on the processor 2104. The processor 2104 invokes the instruction or program in the memory 2105 to perform the method performed by each module shown in FIG. 18, and implements the same technical effect, which will not be described in detail herein again to avoid repetition.

Embodiments of this application further provide a non-transitory readable storage medium storing therein a program or instruction. The program or instruction, when executed by a processor, implements various processes of the embodiments of the data transmission processing method, and may implement the same technical effect, which will not be described in detail herein again to avoid repetition.

The processor is a processor in the electronic device described in the foregoing embodiment. The non-transitory readable storage medium includes a non-transitory computer-readable storage medium, for example, a Read-Only Memory (ROM), a Random Access Memory (RAM), a magnetic disk, an optical disc or the like.

Embodiments of this application further provide a chip. The chip includes a processor and a communication interface. The communication interface is coupled to the processor. The processor is configured to run a program or an instruction to implement various processes of the data transmission processing method embodiment, and may implement the same technical effects, which will not be described in detail herein again to avoid repetition.

It should be understood that the chip mentioned in the embodiments of this application may further be referred to as a system-level chip, a system chip, a chip system, a system on chip, or the like.

Embodiments of this application further provide a computer program product, being stored in a non-volatile storage medium, where the computer program product, when executed by a processor, implements various processes of the data transmission processing method embodiment, and may implement the same technical effects. To avoid repetition, details are not described herein again.

It is to be noted that the terms "include", "comprise" and any other variants mean to cover the non-exclusive inclusion, so that the process, method, object, or apparatus which include a series of elements not only include those elements, but also include other elements which are not clearly listed, or include inherent elements of the process, method, object, or apparatus. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially, or the part contributing to the related art, may be presented in the form of a computer software product. The computer software product is stored in a storage medium (for example, a ROM/RAM, a magnetic disk, or an optical disc) including several instructions to enable a terminal (which may be a mobile phone, a computer, a server, an air conditioner, a base station, or the like) to perform the methods described in embodiments of this application.

Although embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A data transmission processing method, comprising:
    performing, by a transmit end, spectrum spreading on to-be-transmitted data through K orthogonal sequences, to obtain K orthogonal data matrices, wherein K is an integer greater than 1;
    mapping, by the transmit end, the K orthogonal data matrices onto different frequency division multiplexing (OFDM) subcarriers, to obtain K first OFDM signals, wherein the first OFDM signals are spectrum spreading data matrix OFDM signals;

performing, by the transmit end, inverse fast Fourier transform (IFFT) processing on a $k^{th}$ first OFDM signal among the K first OFDM signals, to obtain a $k^{th}$ first OFDM time domain signal, wherein k is a positive integer less than or equal to K; and mapping, by the transmit end, the $k^{th}$ first OFDM time domain signal onto a $k^{th}$ transmit antenna, and transmitting a first data signal through the $k^{th}$ transmit antenna;

wherein the performing, by a transmit end, spectrum spreading on to-be-transmitted data through K orthogonal sequences, to obtain K orthogonal data matrices comprises:

performing, by the transmit end, time-frequency domain spectrum spreading on the to-be-transmitted data through the K orthogonal sequences, to obtain the K orthogonal data matrices, wherein a rule of the time-frequency domain spectrum spreading meets any of the following:

after time domain spectrum spreading is first performed on $K_t$ OFDM symbols, frequency domain spectrum spreading is performed on $K_f$ subcarriers, both $K_t$ and $K_f$ are positive integers, and a sum of $K_t$ and $K_f$ is greater than 2; and after frequency domain spectrum spreading is first performed on the $K_f$ subcarriers, time domain spectrum spreading is performed on the $K_t$ OFDM symbols, both $K_t$ and $K_f$ are positive integers, and the sum of $K_t$ and $K_f$ is greater than 2;

wherein a length K' of the orthogonal sequence meets: $K'=K_t K_f$, and $K' \geq K$.

2. The method according to claim 1, wherein K' is configured or pre-configured through higher layer signaling, or K' is determined based on a quantity of antennas; or, wherein $K_t$ and $K_f$ are indicated through lower layer signaling.

3. The method according to claim 1, wherein the method further comprises:

mapping, by the transmit end, the to-be-transmitted data onto different OFDM subcarriers, to obtain K" second OFDM signals, wherein K" is a positive integer less than or equal to K;

performing, by the transmit end, inverse fast Fourier transform (IFFT) processing on a $k^{th}$ second OFDM signal among the K second OFDM signals, to obtain a $k^{th}$ second OFDM time domain signal, wherein k is a positive integer less than or equal to K"; and mapping, by the transmit end, the $k^{th}$ second OFDM time domain signal onto K transmit antennas through multiple input multiple output (MIMO) precoding or MIMO beamforming, and transmitting a second data signal through the K transmit antennas, wherein the first data signal is carried in a first transport block, the second data signal is carried in a second transport block, and the first transport block and the second transport block are alternately transmitted in time domain.

4. The method according to claim 3, wherein the first data signals transmitted on different antennas are orthogonal to each other;

or, wherein the performing, by the transmit end, beamforming according to a transmission type and a direction of arrival (DoA) obtained in the first transport block comprises:

performing, by the transmit end, beamforming on a communication object (CO) entity of a receive end according to the transmission type and the DoA obtained in the first transport block; and performing, by the transmit end, beamforming on a reflection object (RO) entity of the receive end according to the transmission type and the DoA obtained in the first transport block in a case that quality of service (QOS) of the CO entity is met, and the transmit end has remaining available shaped beams and/or energy that are used for transmission with the CO entity.

5. The method according to claim 3, wherein in a case that the transmit end transmits the second data signal through the second transport block, the method further comprises:

performing, by the transmit end, beamforming according to a transmission type and a direction of arrival (DoA) obtained in the first transport block, wherein the transmission type is single-user MIMO or multi-user MIMO;

wherein the performing, by the transmit end, beamforming according to a transmission type and a DoA obtained in the first transport block comprises:

determining, by the transmit end, at least two beam directions of each MIMO layer according to azimuth angles of a CO entity and a RO entity; and performing, by the transmit end, beamforming on the CO entity and the RO entity in the at least two beam directions for each MIMO layer;

wherein in each MIMO layer, a quantity of beamformed beams oriented to the CO entity is one, and a quantity of beamformed beams oriented to the RO entity is at least one.

6. The method according to claim 3, wherein a first beam corresponding to the first data signal and a second beam corresponding to the second data signal meet the following conditions:

the first beam has different beam directions in two adjacent time periods; and the second beam has an unchanged beam direction in different time periods;

or, wherein the first transport block comprises X sensing sub-blocks, each sensing sub-block comprises N OFDM symbols, and both X and N are positive integers;

or, wherein the second transport block comprises Y slots, and Y is a positive integer;

or, wherein the transmit end periodically and alternately transmits the first data signal and the second data signal through the first transport block and the second transport block; or the transmit end transmits the first data signal through the first transport block or transmits the second data signal through the second transport block according to target switching signaling, wherein the target signaling is used for indicating to transmit a data signal through the first transport block or the second transport block.

7. The method according to claim 1, wherein after the mapping, by the transmit end, the $k^{th}$ first OFDM time domain signal onto a $k^{th}$ transmit antenna, and transmitting a first data signal through the $k^{th}$ transmit antenna, the method further comprises:
receiving, by the transmit end, feedback information and first indication information transmitted by a communication object (CO) entity of a receive end, wherein the feedback information is used for indicating that the first data signal is successfully received, and the first indication information is used for indicating a geographical location of the CO entity.

8. The method according to claim 7,
wherein the feedback information and the first indication information are carried on a physical uplink shared channel (PUSCH); or,
wherein the first indication information is carried in higher layer signaling.

9. A data transmission processing method, comprising:
receiving, by a receive end, a target data signal;
performing, by the receive end, preprocessing on the target data signal, to obtain a target time domain signal;
performing, by the receive end, discrete Fourier transform on the target time domain signal to obtain a data matrix; and
performing, by the receive end by using an orthogonal sequence, inverse spectrum spreading processing on the data matrix to obtain a received signal in a case that the target data signal is a first data signal, wherein
the data matrix is an orthogonal data matrix in a case that the target data signal is the first data signal;
wherein after the performing, by the receive end by using an orthogonal sequence, inverse spectrum spreading processing on the data matrix to obtain a received signal, the method further comprises:
performing, by the receive end, direction of arrival (DoA) detection on the received signal, to obtain a target DoA;
performing, by the receive end according to the target DoA, receiving beamforming processing, to obtain a received matrix signal; and
calculate, by the receive end by using an OFDM radar algorithm, the received matrix signal, to obtain a range and a Doppler frequency shift.

10. The method according to claim 9, wherein the performing, by the receive end, direction of arrival (DoA) detection on the received signal, to obtain a target DoA comprises:
constructing, by the receive end, a first spatial covariance matrix, wherein the first spatial covariance matrix is associated with a signal-to-noise ratio;
calculating, by the receive end by using the received signal, the first spatial covariance matrix, to obtain a second spatial covariance matrix; and
calculating, by the receive end by using a target algorithm, the second spatial covariance matrix, to obtain the target DoA, wherein
the target algorithm is a Capon algorithm or a MUSIC algorithm;
wherein the first spatial covariance matrix meets at least one of the following:
in a case that the signal-to-noise ratio is less than a first preset value, the first spatial covariance matrix is constructed based on a first spatial diversity operation method, and the first spatial diversity operation method is associated with only receive antenna diversity; and
in a case that the signal-to-noise ratio is greater than or equal to the first preset value, the first spatial covariance matrix is constructed based on a second spatial diversity operation method, and the first spatial diversity operation method is associated with transmit antenna diversity and the receive antenna diversity.

11. The method according to claim 9, wherein the receiving, by a receive end, a target data signal comprises:
alternately receiving, by the receive end, the first data signal transmitted through a first transport block and a second data signal transmitted through a second transport block.

12. The method according to claim 11,
wherein the second data signal carries a second time domain signal, and the second time domain signal is obtained based on a conventional multiple input multiple output (MIMO) orthogonal frequency division multiplexing (OFDM) manner;
or,
wherein the alternately receiving, by the receive end, the first data signal transmitted through a first transport block and a second data signal transmitted through a second transport block comprises:
periodically and alternately receiving, by the receive end, the first data signal transmitted through the first transport block and the second data signal transmitted through the second transport block; or
receiving, by the receive end according to target switching signaling, the first data signal transmitted through the first transport block and the second data signal transmitted through the second transport block, wherein the target signaling is used for indicating to receive a data signal through the first transport block or the second transport block.

13. The method according to claim 9, wherein the performing, by the receive end according to the target DoA, receiving beamforming processing, to obtain a received matrix signal comprises:
performing, by the receive end according to the target DoA and a minimum variance distortion-free response (MVDR) method, receiving beamforming processing, to obtain the received matrix signal.

14. The method according to claim 9, wherein after the receiving, by a receive end, a target data signal, the method further comprises:
transmitting, by the receive end, feedback information and first indication information to a transmit end, wherein the feedback information is used for indicating that the first data signal is successfully received, and the first indication information is used for indicating a geographical location of a CO entity.

15. The method according to claim 14,
wherein the feedback information and the first indication information are carried on a physical uplink shared channel (PUSCH); or,
wherein the first indication information is carried in higher layer signaling.

16. A communication device, comprising: a memory, a processor, and a program stored in the memory and executable on the processor, wherein the program, when executed by the processor, causes the communication device to perform:
performing spectrum spreading on to-be-transmitted data through K orthogonal sequences, to obtain K orthogonal data matrices, wherein K is an integer greater than 1;
mapping the K orthogonal data matrices onto different frequency division multiplexing (OFDM) subcarriers, to obtain K first OFDM signals, wherein the first OFDM signals are spectrum spreading data matrix OFDM signals;

performing inverse fast Fourier transform (IFFT) processing on a $k^{th}$ first OFDM signal among the K first OFDM signals, to obtain a $k^{th}$ first OFDM time domain signal, wherein k is a positive integer less than or equal to K; and mapping the $k^{th}$ first OFDM time domain signal onto a $k^{th}$ transmit antenna, and transmitting a first data signal through the $k^{th}$ transmit antenna;

wherein the performing, by a transmit end, spectrum spreading on to-be-transmitted data through K orthogonal sequences, to obtain K orthogonal data matrices comprises:

performing, by the transmit end, time-frequency domain spectrum spreading on the to-be-transmitted data through the K orthogonal sequences, to obtain the K orthogonal data matrices, wherein a rule of the time-frequency domain spectrum spreading meets any of the following:

after time domain spectrum spreading is first performed on $K_t$ OFDM symbols, frequency domain spectrum spreading is performed on $K_f$ subcarriers, both $K_t$ and $K_f$ are positive integers, and a sum of $K_t$ and $K_f$ is greater than 2; and after frequency domain spectrum spreading is first performed on the $K_f$ subcarriers, time domain spectrum spreading is performed on the $K_t$ OFDM symbols, both $K_t$ and $K_f$ are positive integers, and the sum of $K_t$ and $K_f$ is greater than 2;

wherein a length K' of the orthogonal sequence meets: $K'=K_t K_f$, and $K' \geq K$.

17. A communication device, comprising: a memory, a processor, and a program stored in the memory and executable on the processor, wherein the program, when executed by the processor, implements the steps of the data transmission processing method according to claim 9.

18. A non-transitory readable storage medium, storing a program or an instruction, wherein the program or instruction, when executed by a processor, implements the steps of the data transmission processing method according to claim 1.

* * * * *